US012634492B2

(12) United States Patent     (10) Patent No.:   US 12,634,492 B2
Yang et al.          (45) Date of Patent:     May 19, 2026

(54) DECODING METHOD AND APPARATUS, CODING METHOD AND APPARATUS, AND DEVICE

(71) Applicant: HANGZHOU HIKVISION DIGITAL TECHNOLOGY CO., LTD., Hangzhou (CN)

(72) Inventors: Yuhua Yang, Hangzhou (CN); Zongmiao Ye, Hangzhou (CN); Xiaoyang Wu, Hangzhou (CN); Fangdong Chen, Hangzhou (CN); Li Wang, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 19/139,640

(22) PCT Filed: Dec. 14, 2023

(86) PCT No.: PCT/CN2023/138721
§ 371 (c)(1),
(2) Date: Jun. 16, 2025

(87) PCT Pub. No.: WO2024/125593
PCT Pub. Date: Jun. 20, 2024

(65) Prior Publication Data
US 2026/0032271 A1     Jan. 29, 2026

(30) Foreign Application Priority Data
Dec. 16, 2022    (CN) .......................... 202211628072.1

(51) Int. Cl.
  H04N 19/30       (2014.01)
  H04N 19/136      (2014.01)
  (Continued)

(52) U.S. Cl.
  CPC ........... H04N 19/30 (2014.11); H04N 19/136 (2014.11); H04N 19/176 (2014.11); H04N 19/184 (2014.11); H04N 19/42 (2014.11)

(58) Field of Classification Search
None
See application file for complete search history.

(56) References Cited

U.S. PATENT DOCUMENTS

| | | | |
|---|---|---|---|
| 8,121,190 B2 | 2/2012 | Li | |
| 2022/0210430 A1 | 6/2022 | Yoo et al. | |
| 2022/0377376 A1 | 11/2022 | Han et al. | |

FOREIGN PATENT DOCUMENTS

| | | |
|---|---|---|
| CN | 101137047 A | 3/2008 |
| CN | 110536133 A | 12/2019 |

(Continued)

OTHER PUBLICATIONS

Notice of Allowance in Taiwanese Appln. No. 112148809, mailed on Jun. 3, 2024, 4 pages (with English translation).

(Continued)

*Primary Examiner* — Christopher Braniff
(74) *Attorney, Agent, or Firm* — Fish & Richardson P.C.

(57) ABSTRACT

The present disclosure provides a decoding method and apparatus, a coding method and apparatus, and a device. The method comprises: on the basis of on a first code stream corresponding to a current block, acquiring a target probability distribution model corresponding to a first scaling factor; on the basis of the target probability distribution model corresponding to the first scaling factor, decoding a second code stream corresponding to the current block, to obtain a corrected residual feature corresponding to the current block; and, on the basis of the corrected residual feature, determining a reconstructed image block corresponding to the current block. The present disclosure (Continued)

improves the coding performance and the decoding performance.

20 Claims, 7 Drawing Sheets

(51) Int. Cl.

| | |
|---|---|
| *H04N 19/139* | (2014.01) |
| *H04N 19/176* | (2014.01) |
| *H04N 19/184* | (2014.01) |
| *H04N 19/42* | (2014.01) |

(56) References Cited

FOREIGN PATENT DOCUMENTS

| | | |
|---|---|---|
| CN | 111898638 A | 11/2020 |
| CN | 114731423 A | 7/2022 |
| TW | I851498 B | 8/2024 |
| WO | WO 2015097126 A1 | 7/2015 |
| WO | WO 2019185769 A1 | 10/2019 |

OTHER PUBLICATIONS

Office Action in Taiwanese Appln. No. 112148809, mailed on Feb. 22, 2024, 15 pages (with English translation).

International Search Report in International Appln. No. PCT/CN2023/138721, mailed on Mar. 6, 2024, 4 pages (with English translation).

Balle et al., "Variational image compression with a scale hyperprior," presented at the Sixth International Conference on Learning Representations, Vancouver, Canada, May 1, 2018, 23 pages.

Cuize et al., "Asymmetric Gained Deep Image Compression With Continuous Rate Adaptation," presented at the IEEE/CVF Conference on Computer Vision and Pattern Recognition (CVPR), Nashville, Tennessee, Jun. 20-25, 2021, 10 pages.

Extended European Search Report in European Appln. No. 23902787.3, mailed on Mar. 13, 2026, 14 pages.

Minnen et al., "Joint Autoregressive and Hierarchical Priors for Learned Image Compression," Advanced in Neural Information Processing Systems, Sep. 8, 2018, 22 pages.

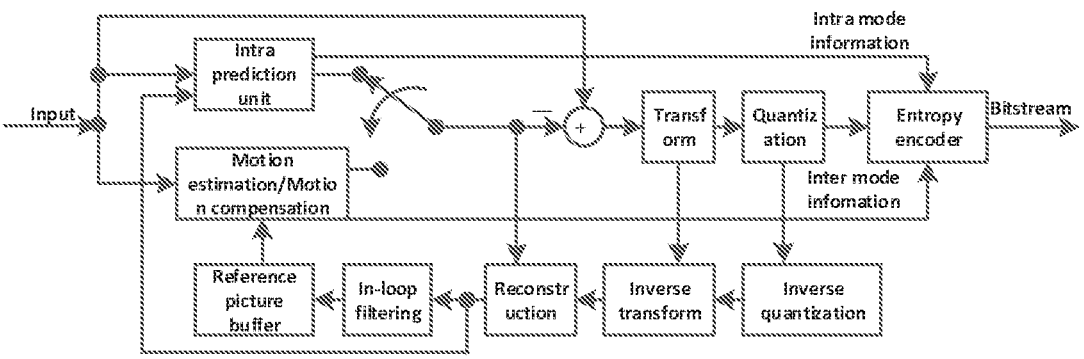

FIG. 1

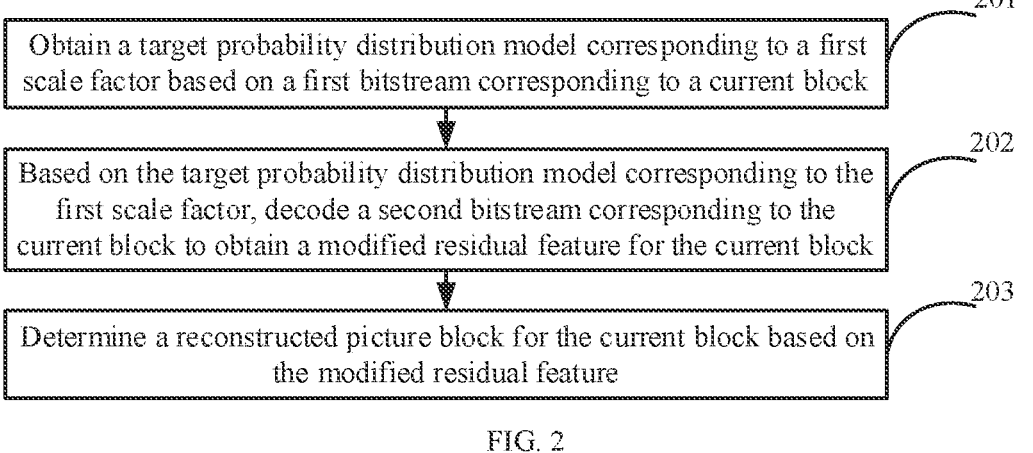

201

Obtain a target probability distribution model corresponding to a first scale factor based on a first bitstream corresponding to a current block

202

Based on the target probability distribution model corresponding to the first scale factor, decode a second bitstream corresponding to the current block to obtain a modified residual feature for the current block

203

Determine a reconstructed picture block for the current block based on the modified residual feature

FIG. 2

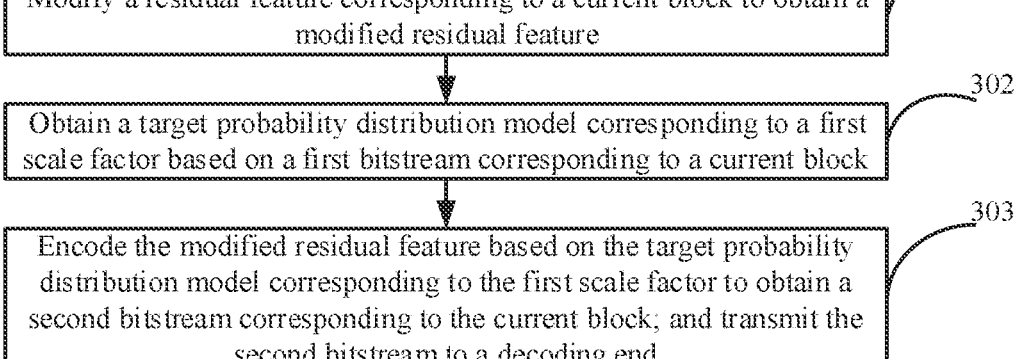

301

Modify a residual feature corresponding to a current block to obtain a modified residual feature

302

Obtain a target probability distribution model corresponding to a first scale factor based on a first bitstream corresponding to a current block

303

Encode the modified residual feature based on the target probability distribution model corresponding to the first scale factor to obtain a second bitstream corresponding to the current block; and transmit the second bitstream to a decoding end

FIG. 3

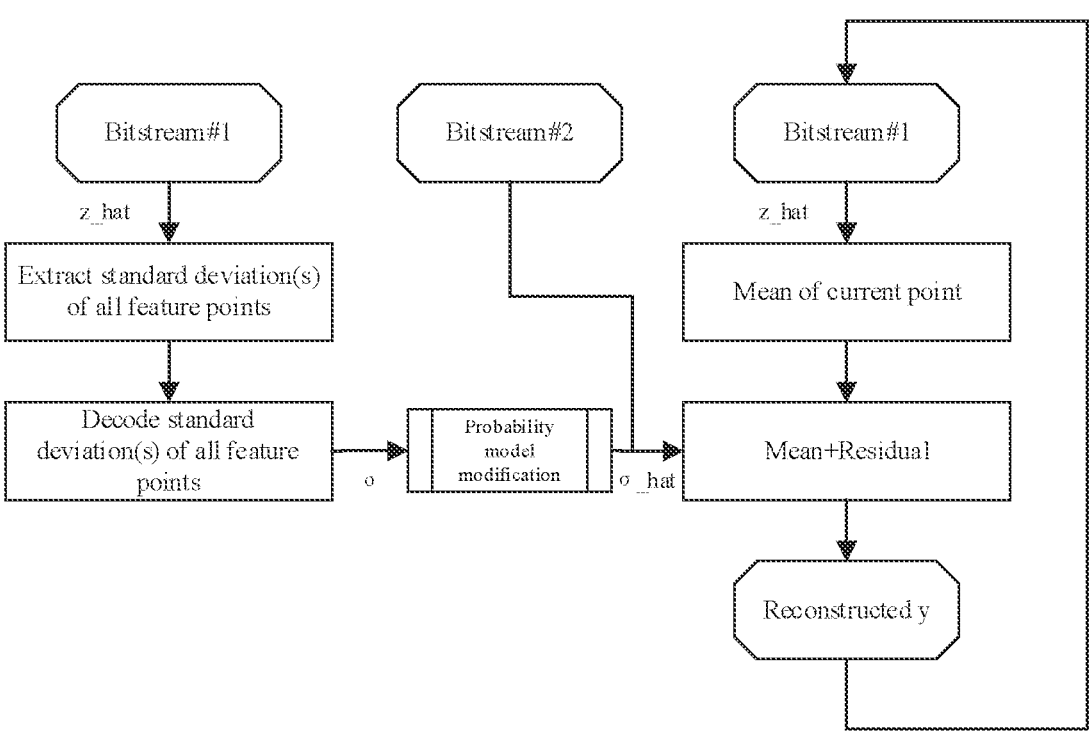
FIG. 8
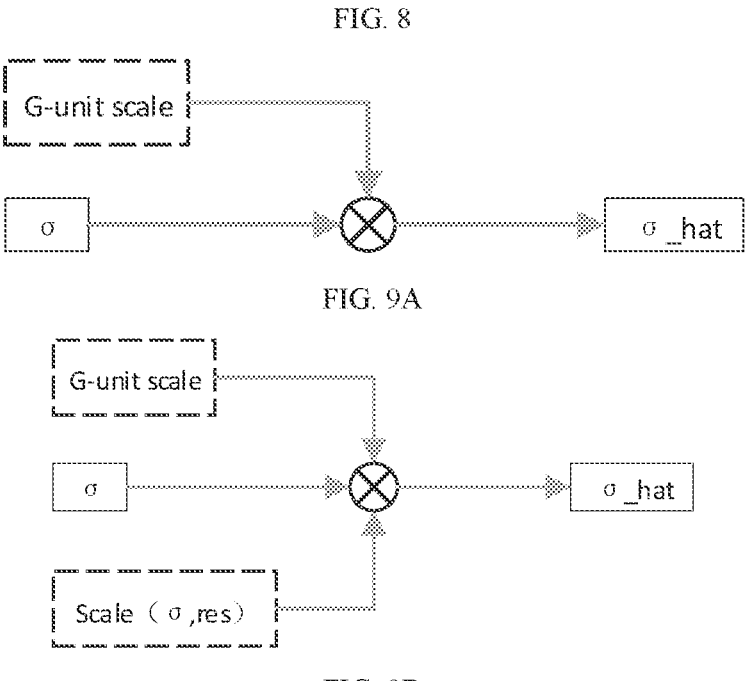
FIG. 9A
FIG. 9B

DECODING METHOD AND APPARATUS, CODING METHOD AND APPARATUS, AND DEVICE

CROSS REFERENCE TO RELATED APPLICATIONS

This application is a US National Phase of a PCT Application No. PCT/CN2023/138721 filed on Dec. 14, 2023, which claims priority to Chinese Patent Application No. 2022116280721 filed on Dec. 16, 2022, the entire contents of which are incorporated herein by reference in their entireties.

TECHNICAL FIELD

The present disclosure relates to the field of encoding and decoding technology. particularly to decoding and encoding methods and apparatuses, and devices thereof.

BACKGROUND

To save space, video pictures are encoded before transmission, and complete video encoding can include processes such as prediction, transformation, quantization, entropy encoding, filtering, etc. The prediction process can include intra prediction and inter prediction. Inter prediction utilizes a temporal correlation of a video to predict pixels of a current picture by pixels of an adjacent encoded picture, to remove temporal redundancy in the video. Intra prediction utilizes a spatial correlation of a video to predict a current pixel using pixels of encoded blocks in a current frame picture, to remove spatial redundancy in the video.

With the rapid development of deep learning, deep learning has achieved success in many high-level computer vision problems, such as picture classification, object detection, etc. Deep learning is also gradually being applied in the field of encoding and decoding, that is, a neural network can be used to encode and decode pictures. Although encoding and decoding methods based on neural networks have shown great performance potential, the encoding and decoding methods based on neural networks still suffer from issues such as poor encoding performance, poor decoding performance, and high complexity.

SUMMARY

In view of this, the present disclosure provides decoding and encoding methods and apparatuses, and devices thereof to improve encoding and decoding performance.

In the first aspect, the embodiments of the present disclosure provide a decoding method, performed by a decoding end, comprising:

obtaining a target probability distribution parameter corresponding to a first scale factor based on a first bitstream corresponding to the current block; and determining a target probability distribution model based on the target probability distribution parameter;

decoding, based on the target probability distribution model corresponding to the first scale factor, a second bitstream corresponding to the current block to obtain a modified residual feature for the current block; and determining a reconstructed picture block for the current block based on the modified residual feature;

wherein when the target probability distribution parameter comprises the target standard deviation, obtaining the target probability distribution parameter corresponding to the first scale factor based on the first bitstream corresponding to the current block comprises:

decoding the first bitstream to obtain an initial coefficient hyperparameter feature corresponding to the current block;

performing coefficient hyperparameter feature inverse transformation on the initial coefficient hyperparameter feature to obtain an initial standard deviation; and modifying the initial standard deviation based on the first scale factor to obtain the target standard deviation.

In some embodiments, performing the coefficient hyperparameter feature inverse transformation on the initial coefficient hyperparameter feature to obtain the initial standard deviation comprises:

inputting the initial coefficient hyperparameter feature into a hyperscale decoding network, where the coefficient hyperparameter feature inverse transformation is performed by the hyperscale decoding network on the initial coefficient hyperparameter feature to obtain the initial standard deviation;

wherein the hyperscale decoding network is a trained neural network.

In some embodiments, modifying the initial standard deviation based on the first scale factor to obtain the target standard deviation comprises:

determining a product value of the initial standard deviation and the first scaling factor as the target standard deviation.

In some embodiments, the target probability distribution parameter further comprises a target mean.

In some embodiments, the target mean is 0.

In the second aspect, the embodiments of the present disclosure provide an encoding method, performed by an encoding end, comprising:

modifying a residual feature corresponding to a current block to obtain a modified residual feature;

obtaining a target probability distribution parameter corresponding to a first scaling factor;

determining a target probability distribution model based on the target probability distribution parameter; and encoding the modified residual feature based on the target probability distribution model to obtain a second bitstream corresponding to the current block; and transmitting the second bitstream to a decoding end;

wherein, when the target probability distribution parameter comprises a target standard deviation, and obtaining the target probability distribution parameter corresponding to the first scaling factor comprises:

obtaining an initial coefficient hyperparameter feature;

performing coefficient hyperparameter feature inverse transformation on the initial coefficient hyperparameter feature to obtain an initial standard deviation;

modifying the initial standard deviation based on the first scaling factor to obtain the target standard deviation.

In some embodiments, modifying the residual feature corresponding to the current block to obtain the modified residual feature comprises:

modifying the residual feature corresponding to the current block based on the first scale factor to obtain the modified residual feature.

In some embodiments, the method further comprises:

performing feature transformation on the current block to obtain a picture feature corresponding to the current block;

3 performing coefficient hyperparameter feature transformation on the picture feature to obtain an initial coefficient hyperparameter feature corresponding to the current block; and encoding the initial coefficient hyperparameter feature to obtain the first bitstream.

In some embodiments, the target probability distribution parameter further comprises a target mean.

In some embodiments, the target mean is 0.

In the third aspect, the embodiments of the present disclosure provide a decoding device, comprising: one or more memories configured to store video data; and a decoder configured to implement the method according to any one of the embodiments of the first aspect.

In the fourth aspect, the embodiments of the present disclosure provide an encoding device, comprising: one or more memories configured to store video data; and an encoder configured to implement the method according to any one of the embodiments of the second aspect.

In the fifth aspect, the embodiments of the present disclosure provide a decoding end device, comprising: one or more processors and one or more machine-readable storage media, wherein the one or more machine-readable storage media store machine executable instructions that are executable by the one or more processors; and the one or more processors are configured to execute the machine executable instructions to implement the method according to any one of the embodiments of the first aspect.

In the sixth aspect, the embodiments of the present disclosure provide an encoding end device, comprising, one or more processors and one or more machine-readable storage media wherein the one or more machine-readable storage media store machine executable instructions that are executable by the one or more processors; and the one or more processors are configured to execute the machine executable instructions to implement the method according to any one of the embodiments of the second aspect.

In the seventh aspect, the embodiments of the present disclosure provide an electronic device, comprising: one or more processors and one or more machine-readable storage media, wherein the one or more machine-readable storage media store machine executable instructions that are executable by the one or more processors, and the one or more processors are configured to execute the machine executable instructions to implement the method according to any one of the embodiments of the first aspect or the second aspect.

In the eighth aspect, the embodiments of the present disclosure provide a non-transitory machine readable storage medium, wherein the machine readable storage medium stores computer instructions, and one or more processors execute the computer instructions to implement the method according to any one of the embodiments of the first aspect or the second aspect.

As can be seen from the above technical solutions, in the embodiments of the present disclosure, the target probability distribution model corresponding to the first scale factor is obtained. Based on the target probability distribution model corresponding to the first scale factor, the second bitstream corresponding to the current block is decoded to obtain the residual feature corresponding to the current block. Based on the residual feature, the reconstructed picture block corresponding to the current block is determined. When determining the target probability distribution model, the changes in the residuals can be fully considered and utilized to the target probability distribution model, which makes the probability distribution of describing the residuals more accurate and achieves the goal of reducing the bit rate. The parameter of the target probability distribution model used for encoding the residual is synchronously adjusted with the residual. The scale factor for the residual at the encoding end is applied to the original probability distribution model to obtain the target probability distribution model. Encoding and decoding based on the target probability distribution model can improve the encoding and decoding performance, and have low complexity.

BRIEF DESCRIPTION OF DRAWINGS

FIG. 1 is a schematic diagram of a video encoding framework.

FIG. 2 is a flowchart of a decoding method according to an embodiment of the present disclosure.

FIG. 3 is a flowchart of an encoding method according to an embodiment of the present disclosure.

FIG. 8 is a flowchart of a decoding method according to an embodiment of the present disclosure.

FIGS. 9A and 9B are schematic diagrams of correction for an initial standard deviation according to an embodiment of the present disclosure.

DETAILED DESCRIPTION

Figure 4:
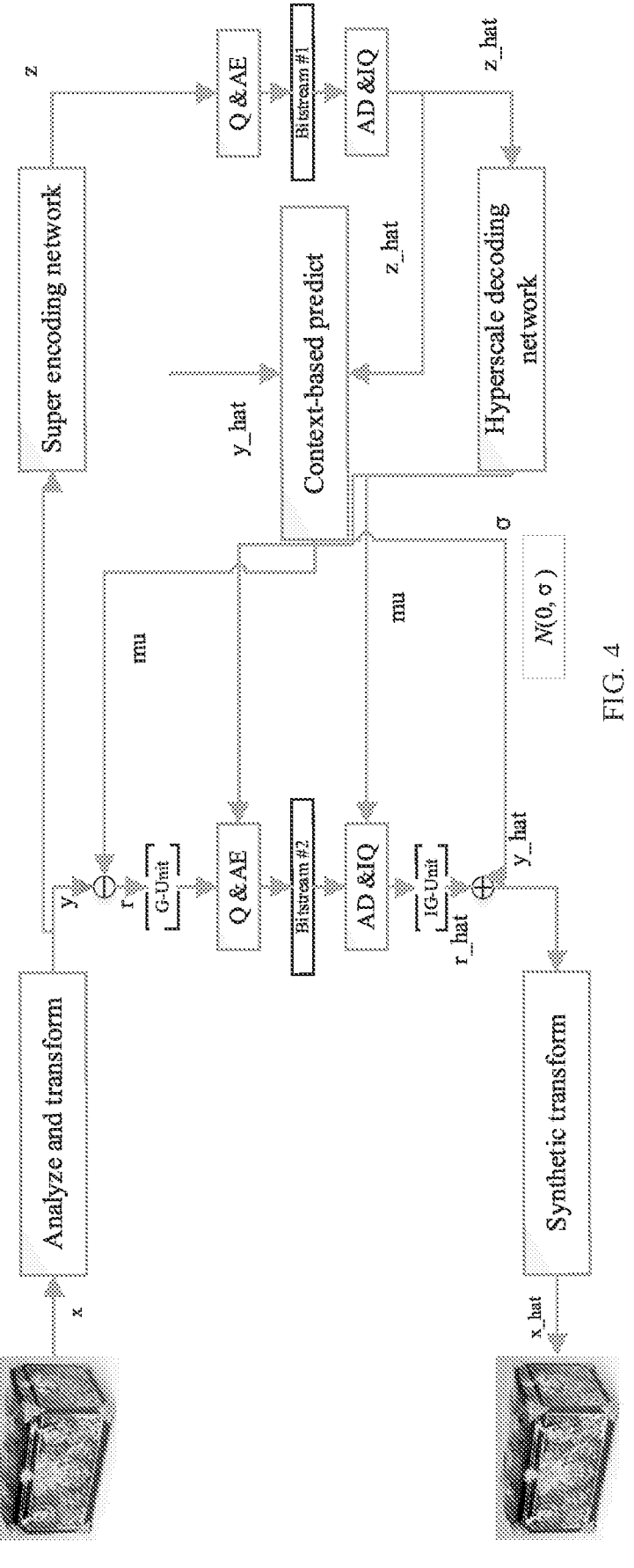
FIG. 4 is a schematic diagram of a processing procedure of an encoding end according to an embodiment of the present disclosure.

The terms used in the embodiments of the present disclosure are only for the purpose of describing specific embodiments and are not intended to limit the present disclosure. As used in the present disclosure and claims, the singular forms "a," "said," and "the" are intended to include the plural forms as well, unless the context clearly indicates otherwise. It should also be understood that the term "and/or" as used herein refers to and includes any and all possible combinations of one or more of the associated listed items. It shall be understood that, although the terms "first," "second." "third." and the like can be used herein to describe various information, the information should not be limited by these terms. These terms are only used to distinguish the same type of information from each other. For example, without departing from the scope of the present disclosure, first information can be referred as second information; and similarly, second information can also be referred as first information. according to the context. The word "if" as used herein can be interpreted as "at the time of," "when," or "in response to determining that."

The embodiments of the present disclosure propose decoding and encoding methods, which may involve the following concepts.

Neural Network (NN): the neural network refers to an artificial neural network. The neural network is an operational model composed of a large number of interconnected nodes (or neurons). In the neural network, neuron processing units can represent different objects. such as features, letters, concepts, or some meaningful abstract patterns. The types of processing units in the neural network can be divided into three categories: input units, output units, and hidden units. The input units receive signals and data from the outside. The output units realize the output of processing results. The hidden units are located between the input units and the output units and cannot be observed from outside the system. The connection weight between neurons reflects the strength of the connection between units, and the representation and processing of information are reflected in the connection relationships between processing units. The neural network is a non-programmed, brain like information processing method that essentially obtains a parallel distributed information processing function through the transform and dynamic behaviour of the neural network, and imitates the information processing function of the nervous system of the human brain to different degrees and levels. In the field of video processing, a commonly used neural network can include but is not limited to: a Convolutional Neural Network (CNN), a Recurrent Neural Network (RNN), or a Fully Connected Network, etc.

Convolutional Neural Network (CNN): the convolutional neural network is a type of feedforward neural network and is one of the most representative network structures in deep learning technology. The artificial neurons of Convolutional Neural Network can respond to surrounding units within a certain coverage area, and have excellent performance in large-scale picture processing. The basic structure of a convolutional neural network includes two layers, one of which is the feature extraction layer (also referred to as the convolutional layer), and the input of each neuron is connected to a local receptive field of the previous layer and extracts the local features. Once the local features are extracted, a positional relationship between the partial features and other features is also determined. The second layer is the feature mapping layer (also referred to as the activation layer), where each computational layer of the neural network consists of multiple feature maps. Each feature map is a plane, and the weights of all neurons on the plane are equal. The feature mapping structure can use Sigmoid function, ReLU function, Leaky-ReLU function, PReLU function, or GDN function, etc. as the activation function for the convolutional network. In addition, since neurons on one mapping surface share a weight, the number of free parameters in the network is reduced.

For example, one of the advantages of the convolutional neural network over picture processing algorithms is that it avoids the complex pre-processing process (such as extracting artificial features) of the pictures, and can directly input the original picture for end-to-end learning. One of the advantages of the convolutional neural network compared to ordinary neural networks is that ordinary neural networks adopt a fully connected approach, where all neurons from the input layer to the hidden layer are connected, which results in a huge number of parameters, makes network training time-consuming or even difficult. The convolutional neural network can avoid this difficulty through local connections, weight sharing, and other approaches.

Deconvolution: the deconvolutional layer, also referred to as transposed convolution layer, works similarly to convolution layer. The main difference is that the deconvolutional layer uses padding to make the output greater than the input (the output and the input can also be kept the same). If the stride is 1, it means that the output size is equal to the input size; If stride is N, it means that the width of the output feature is N times the width of the input feature, and the height of the output feature is N times the height of the input feature.

Generalization Ability: the generalization ability can refer to the adaptability of a machine learning algorithm to fresh samples. The purpose of learning is to learn the hidden patterns behind data pairs. For data outside the learning set that has the same pattern, the trained network can further provide appropriate outputs. This ability can be called generalization ability.

Rate-Distortion Optimized: there are two major indicators for evaluating encoding efficiency, code rate and Peak Signal to Noise Ratio (PSNR). The smaller the bitstream, the higher the compression rate, the higher the PSNR, and the better the quality of the reconstructed picture. In mode selection, the discrimination formula is essentially a comprehensive evaluation of the both. For example, the cost corresponding to a mode: $J \ (mode)=D+\lambda*R$, where D represents distortion, which can usually be measured using the SSE index. SSE refers to the mean square sum of the differences between the reconstructed picture block and the source picture. To realize cost consideration, the SAD index can also be used, where the SAD refers to the sum of the absolute differences between the reconstructed picture block and the source picture. $\lambda$ represents the Lagrange multiplier, and R represents the actual number of bits required for picture block encoding in this mode, including the total number of bits required for encoding mode information, motion information, and residuals, etc. When selecting modes, using the Rate-Distortion Optimized to compare and make decisions on encoding modes can usually ensure the best encoding performance.

Entropy Encoding: entropy encoding refers to the encoding process that follows the principle of entropy without losing any information, where information entropy is the average amount of information (a measure of uncertainty) of the source. For example, common entropy encoding methods can include but are not limited to: Shannon encoding, Huffman encoding, and arithmetic coding.

Video encoding framework: FIG. 1 is a schematic diagram of the video encoding framework at the encoding end. This video encoding framework can be used to implement the processing flow of the encoding end of the embodiments of the present disclosure. The schematic diagram of the video decoding framework can be similar to FIG. 1 and will not be repeated here. The processing flow of the decoding end of the embodiments of the present disclosure can be implemented using the video decoding framework.

For example, as shown in FIG. 1, the video encoding framework can include modules such as prediction, transform, quantization, entropy encoder, inverse quantization, inverse transform, reconstruction, and filtering, etc. At the encoding end, the processing flow of the encoding end can be achieved through the cooperation between these modules. In addition, the video decoding framework can include modules such as prediction, transform, quantization, entropy decoder, inverse quantization, inverse transform, reconstruction, and filtering, etc. At the decoding end, the processing flow of the decoding end can be achieved through the cooperation between these modules.

There are many encoding tools proposed for each module of the encoding end, and each tool usually has multiple modes. For different video sequences, the encoding tools that can achieve optimal encoding performance are often different. Therefore, in the encoding process, Rate-Distortion Optimize (RDO) is usually used to compare the encoding performance of different tools or modes to select the best mode. After determining the optimal tool or mode, the decision information of the tool or mode is transmitted by encoding flag information in the bitstream. Although this approach brings high encoding complexity, it can adaptively select the optimal mode combination for different contents and achieve the best encoding performance. The decoding end can obtain relevant mode information by directly parsing the flag information, which has less complexity impact.

In the embodiments of the present disclosure, decoding methods and encoding methods are proposed, where a modified residual can be decoded and encoded based on a probability distribution model, which reduces the bit rate by obtaining the probability distribution model that is more in line with the data.

The following provides a detailed explanation of the decoding and encoding methods in the embodiments of the present disclosure, based on several embodiments.

Embodiment 1: a decoding method is proposed in the embodiments of the present disclosure, as shown in FIG. 2, which is a flowchart of the method. The method can be applied to the decoding end (also referred to as the video decoder), and can include steps 201 to 203.

In step 201, a target probability distribution model corresponding to a first scale factor is obtained based on a first bitstream corresponding to a current block.

In step 202, based on the target probability distribution model corresponding to the first scale factor, a second bitstream corresponding to the current block is decoded to obtain a modified residual feature for the current block.

In step 203, a reconstructed picture block for the current block is determined based on the modified residual feature.

For example, obtaining the target probability distribution model corresponding to the first scale factor based on the first bitstream corresponding to the current block can include but is not limited to: obtaining a target probability distribution parameter corresponding to the first scale factor based on the first bitstream corresponding to the current block; and determining the target probability distribution model based on the target probability distribution parameter. Where the target probability distribution parameter includes but is not limited to a target mean, a target standard deviation, or both. The target mean and target standard deviation are only examples, which is not limited.

In an embodiment, when the target probability distribution parameter includes the target standard deviation, obtaining the target probability distribution parameter corresponding to the first scale factor based on the first bitstream corresponding to the current block may include but is not limited to: decoding the first bitstream to obtain an initial coefficient hyperparameter feature corresponding to the current block: performing coefficient hyperparameter feature inverse transformation on the initial coefficient hyperparameter feature to obtain an initial standard deviation; and modifying the initial standard deviation based on the first scale factor to obtain the target standard deviation.

For example, modifying the initial standard deviation based on the first scale factor to obtain the target standard deviation can include but is not limited to, generating a target scale factor based on the first scale factor; and modifying the initial standard deviation based on the target scale factor to obtain the target standard deviation. The target scale factor can be the first scale factor. Alternatively, the target scale factor can be determined based on the first scale factor and a second scale factor, where the second scale factor is configured to represent the mapping relationship between a residual and a standard deviation. The second scale factor can be pre-configured. Alternatively, the second scale factor can be obtained by decoding from the bitstream corresponding to the current block.

In another embodiment, when the target probability distribution parameter includes the target standard deviation, obtaining the target probability distribution parameter corresponding to the first scale factor based on the first bitstream corresponding to the current block may include but is not limited to: decoding the first bitstream to obtain an initial coefficient hyperparameter feature corresponding to the current block; modifying the initial coefficient hyperparameter feature based on the first scale factor to obtain a target coefficient hyperparameter feature; and performing coefficient hyperparameter feature inverse transformation on the target coefficient hyperparameter feature to obtain the target standard deviation.

For example, modifying the initial coefficient hyperparameter feature based on the first scale factor to obtain a target coefficient hyperparameter feature can include but is not limited to: generating a target scale factor based on the first scale factor, and modifying the initial coefficient hyperparameter feature based on the target scale factor to obtain the target coefficient hyperparameter feature. The target scale factor can be the first scale factor. Alternatively, the target scale factor may be determined based on the first scale factor and the third scale factor, where the third scale factor is configured to represent the mapping relationship between a residual and a coefficient hyperparameter feature. The third scale factor may be pre-configured. Alternatively, the third scale factor can be obtained by decoding from the bitstream corresponding to the current block.

In an embodiment, determining the reconstructed picture block corresponding to the current block based on the modified residual feature may include but is not limited to: demodifying the modified residual feature based on the first scale factor to obtain the unmodified residual feature (i.e., the residual feature before modifying at the encoding end), and determining the reconstructed picture block corresponding to the current block based on the residual feature (i.e., the unmodified residual feature). For example, a mean corresponding to the current block is obtained, and the reconstructed picture block corresponding to the current block is determined based on the residual feature (i.e., the unmodified residual feature) and the mean corresponding to the current block.

In an embodiment, decoding the first bitstream to obtain the initial coefficient hyperparameter feature corresponding to the current block can include but is not limited to: decoding the first bitstream to obtain the hyperparameter quantized feature corresponding to the current block, and performing inverse quantization on the hyperparameter quantized feature to obtain the initial coefficient hyperparameter feature corresponding to the current block. Alternatively, the initial coefficient hyperparameter feature corresponding to the current block can be directly obtained when decoding the first bitstream, without performing inverse quantization.

In an embodiment, decoding, based on the target probability distribution model corresponding to the first scale factor, the second bitstream corresponding to the current block to obtain the modified residual feature for the current block may include, but is not limited to: decoding the second bitstream corresponding to the current block based on the target probability distribution model to obtain the residual quantized feature corresponding to the current block, and performing inverse quantization on the residual quantized feature to obtain the modified residual feature corresponding to the current block. Alternatively, the modified residual feature corresponding to the current block can be directly obtained when decoding the second bitstream corresponding to the current block based on the target probability distribution model.

For example, the above execution order is only for the convenience of describing the given examples. In practical applications, the execution order of steps can also be changed without limitation. Moreover, in other embodiments, the steps of the corresponding method can not necessarily be executed in the order shown and described in the present disclosure, and the steps included in the method can be more or less than those described in the present disclosure. In addition, the single step described in the present disclosure can be decomposed into multiple steps for description in other embodiments. The multiple steps described in the present disclosure can also be combined into a single step for description in other embodiments.

As can be seen from the above technical solutions, in the embodiments of the present disclosure, the target probability distribution model corresponding to the first scale factor is obtained. Based on the target probability distribution model corresponding to the first scale factor, the second bitstream corresponding to the current block is decoded to obtain the residual feature corresponding to the current block. Based on the residual feature, the reconstructed picture block corresponding to the current block is determined. When determining the target probability distribution model, the changes in the residuals can be fully considered and utilized to the target probability distribution model, which makes the probability distribution of describing the residuals more accurate and achieves the goal of reducing the bit rate. The parameter of the target probability distribution model used for encoding the residual is synchronously adjusted with the residual. The scale factor for the residual at the encoding end is applied to the original probability distribution model to obtain the target probability distribution model. Encoding and decoding based on the target probability distribution model can improve the encoding and decoding performance, and have low complexity.

Embodiment 2: an encoding method is proposed in the embodiments of the present disclosure, as shown in FIG. 3, which is a flowchart of the method. The method can be applied to an encoding end (also referred to as a video encoder), and can include steps 301 to 303.

In step 301, a residual feature corresponding to a current block is modified to obtain a modified residual feature.

In step 302, a target probability distribution model corresponding to a first scale factor is obtained based on a first bitstream corresponding to a current block.

In step 303, the modified residual feature is encoded based on the target probability distribution model corresponding to the first scale factor to obtain a second bitstream corresponding to the current block; and transmitting the second bitstream to a decoding end.

For example, modifying the residual feature corresponding to the current block to obtain the modified residual feature can include, but is not limited to: modifying the residual feature corresponding to the current block based on the first scale factor to obtain the modified residual feature.

For example, obtaining the target probability distribution model corresponding to the first scale factor based on the first bitstream corresponding to the current block can include but is not limited to: obtaining a target probability distribution parameter corresponding to the first scale factor based on the first bitstream corresponding to the current block; and determining the target probability distribution model corresponding to the first scale factor based on the target probability distribution parameter.

For example, before obtaining the target probability distribution model corresponding to the first scale factor based on the first bitstream corresponding to the current block, the current block can be subjected to feature transformation to obtain the picture feature corresponding to the current block, the picture feature can be subjected to coefficient hyperparameter feature transformation to obtain the initial coefficient hyperparameter feature corresponding to the current block, and the initial coefficient hyperparameter feature can be encoded to obtain the first bitstream.

For example, encoding the modified residual feature based on the target probability distribution model corresponding to the first scale factor to obtain the second bitstream corresponding to the current block can include but is not limited to: quantifying the modified residual feature to obtain the residual quantized feature corresponding to the current block, and encoding the residual quantized feature based on the target probability distribution model corresponding to the first scale factor to obtain the second bitstream corresponding to the current block. Alternatively, the modified residual feature can be directly encoded based on the target probability distribution model corresponding to the first scale factor to obtain the second bitstream corresponding to the current block, without involving the quantization operation.

For example, encoding the initial coefficient hyperparameter feature to obtain the first bitstream may include but is not limited to: quantizing the initial coefficient hyperparameter feature to obtain the hyperparameter quantized feature corresponding to the current block, and encoding the hyperparameter quantized feature to obtain the first bitstream. Alternatively, the initial coefficient hyperparameter feature can be directly encoded to obtain the first bitstream without involving the quantization operation.

For example, when obtaining the target probability distribution parameter corresponding to the first scale factor based on the first bitstream corresponding to the current block, the target probability distribution parameter includes but is not limited to: the target mean, the target standard deviation, or both. The target mean and target standard deviation are only examples, which is not limited. When the target probability distribution parameter includes the target standard deviation, obtaining the target probability distribution parameter corresponding to the first scale factor based on the first bitstream corresponding to the current block may include but is not limited to: decoding the first bitstream to obtain an initial coefficient hyperparameter feature corresponding to the current block: performing coefficient hyperparameter feature inverse transformation on the initial coefficient hyperparameter feature to obtain an initial standard deviation; and modifying the initial standard deviation based on the first scale factor to obtain the target standard deviation.

For example, modifying the initial standard deviation based on the first scale factor to obtain the target standard deviation can include but is not limited to: generating a target scale factor based on the first scale factor; and modifying the initial standard deviation based on the target scale factor to obtain the target standard deviation. The target scale factor can be the first scale factor. Alternatively, the target scale factor can be determined based on the first scale factor and a second scale factor, where the second scale factor is configured to represent the mapping relationship between a residual and a standard deviation.

In another embodiment, when the target probability distribution parameter includes the target standard deviation, obtaining the target probability distribution parameter corresponding to the first scale factor based on the first bitstream corresponding to the current block may include but is not limited to: decoding the first bitstream to obtain an initial coefficient hyperparameter feature corresponding to the current block; modifying the initial coefficient hyperparameter feature based on the first scale factor to obtain a target coefficient hyperparameter feature; and performing coefficient hyperparameter feature inverse transformation on the target coefficient hyperparameter feature to obtain the target standard deviation.

For example, modifying the initial coefficient hyperparameter feature based on the first scale factor to obtain a target coefficient hyperparameter feature can include but is not limited to: generating a target scale factor based on the first scale factor, and modifying the initial coefficient hyperparameter feature based on the target scale factor to obtain the target coefficient hyperparameter feature. The target scale factor can be the first scale factor. Alternatively, the target scale factor may be determined based on the first scale factor and the third scale factor, where the third scale factor is configured to represent the mapping relationship between a residual and a coefficient hyperparameter feature.

For example, the above execution order is only for the convenience of describing the given examples. In practical applications, the execution order of steps can also be changed without limitation. Moreover, in other embodiments, the steps of the corresponding method can not necessarily be executed in the order shown and described in the present disclosure, and the steps included in the method can be more or less than those described in the present disclosure. In addition, the single step described in the present disclosure can be decomposed into multiple steps for description in other embodiments. The multiple steps described in the present disclosure can also be combined into a single step for description in other embodiments.

As can be seen from the above technical solutions, in the embodiments of the present disclosure, when determining the target probability distribution model, the changes in the residuals can be fully considered and utilized to the target probability distribution model, which makes the probability distribution of describing the residuals more accurate and achieves the goal of reducing the bit rate. The parameter of the target probability distribution model used for encoding the residual is synchronously adjusted with the residual. The scale factor for the residual at the encoding end is applied to the original probability distribution model to obtain the target probability distribution model. Encoding and decoding based on the target probability distribution model can improve the encoding and decoding performance, and have low complexity.

Embodiment 3: for Embodiment 1 and Embodiment 2, the processing procedure of the encoding end can be seen in FIG. 4. FIG. 4 is only an example of the processing procedure of the encoding end, which is not limited.

After obtaining the current block x, the encoding end can perform feature transformation on the current block x (i.e., analyse and transform the current block x) to obtain the picture feature y corresponding to the current block x. Where performing feature transformation on the current block x refers to transforming the current block x to a picture feature y in a latent domain, thereby facilitating all subsequent processes to operate in the latent domain.

After obtaining the picture feature y, the encoding end performs coefficient hyperparameter feature transformation on the picture feature y to obtain the initial coefficient hyperparameter feature z. For example, the picture feature y can be input to a super encoding network, where the super encoding network performs coefficient hyperparameter feature transformation on the picture feature y to obtain the initial coefficient hyperparameter feature z. Where the super encoding network can be a trained neural network. The training process of the super encoding network is not limited, as long as the trained super encoding network can perform the coefficient hyperparameter feature transformation on the picture feature y Where the picture feature y in the latent domain is processed by a super encoding network to obtain hyper prior latent information z.

After obtaining the initial coefficient hyperparameter feature z, the encoding end can quantize the initial coefficient hyperparameter feature z to obtain the hyperparameter quantized feature corresponding to the initial coefficient hyperparameter feature z, where the Q operation in FIG. 4 represents the quantization process. After the hyperparameter quantized feature corresponding to the initial coefficient hyperparameter feature z is obtained, the hyperparameter quantized feature is encoded to obtain the Bitstream #1 (i.e., the first bitstream) corresponding to the current block. The AE operation in FIG. 4 represents the encoding process, such as entropy encoding. Alternatively, the encoding end can directly encode the initial coefficient hyperparameter feature z to obtain the Bitstream #1 corresponding to the current block. Where the hyperparameter quantized feature or initial coefficient hyperparameter feature z carried in Bitstream #1 is mainly used to obtain the mean and the parameter of probability distribution model.

After obtaining the Bitstream #1 corresponding to the current block, the encoding end can transmit the Bitstream #1 corresponding to the current block to the decoding end. The processing procedure of the decoding end for the Bitstream #1 corresponding to the current block is referred to the subsequent embodiments.

After obtaining the Bitstream #1 corresponding to the current block, the encoding end can also decode Bitstream #1 to obtain hyperparameter quantized feature. AD in FIG. 4 represents the decoding process. Then, the hyperparameter quantized feature are inverse quantized to obtain the initial coefficient hyperparameter feature z_hat, where the initial coefficient hyperparameter feature z_hat can be the same or different from the initial coefficient hyperparameter feature z. The IQ operation in FIG. 4 represents the inverse quantization process. Alternatively, after obtaining the Bitstream #1 corresponding to the current block, the encoding end can also decode Bitstream #1 to obtain the initial coefficient hyperparameter feature z_hat, without involving the inverse quantization process.

After obtaining the initial coefficient hyperparameter feature z_hat, the encoding end can perform context-based prediction based on the initial coefficient hyperparameter feature z_hat of the current block and the residual feature y_hat of the previous picture block (the determination of the residual feature y_hat is described in the subsequent embodiments), and obtain the mean mu corresponding to the current block. The prediction process is not limited. Where for the context-based prediction process, the input includes the initial coefficient hyperparameter feature z_hat and the decoded residual feature y_hat, where the initial coefficient hyperparameter feature z_hat and the decoded residual feature y_hat are jointly input to obtain a more accurate mean mu. The mean mu is used to be subtracted from the original feature to obtain the residual and to be added to the decoded residual to obtain the reconstructed y.

After obtaining the picture feature y, the encoding end determines the residual feature r based on the picture feature y and the mean mu. The residual feature r can be understood as the unmodified residual feature r. For example, the difference between the picture feature y and the mean mu can be taken as the residual feature r.

Figure 5:
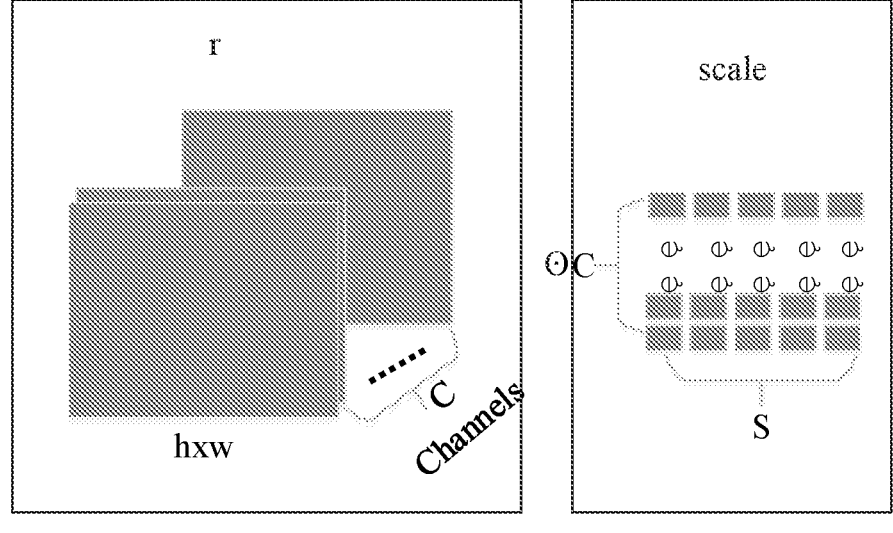
FIG. 5 is a schematic diagram of a G-Unit operation according to an embodiment of the present disclosure.

After obtaining the residual feature r, the encoding end can modify the residual feature r to obtain the modified residual feature r'. For example, the encoding end modifies the residual feature r based on the first scale factor to obtain the modified residual feature r'. For example, the G-Unit operation can be a scaling operation, and the encoding end can scale the residual feature r based on the first scale factor (i.e., calculate the product of the first scale factor and the residual feature r) to obtain the modified residual feature r'. As shown in FIG. 5, the input of the G-Unit operation is the residual feature r, and the output is the scaled residual feature r'. The first scale factor can be "scale", that is, the residual feature r is scaled by the first scale factor to obtain the modified residual feature r'.

From FIG. 4, it can be seen that the residual feature r is subjected to the G-Unit operation before bitstream #2 encoding and decoding. The relationship between the G-Unit operation and residual feature r is shown in FIG. 5. The G-Unit operation includes a trainable matrix, where the trainable matrix is denoted as the first scale factor "scale". C represents the number of channels of features in the latent domain, and $\Theta$ represents the channel-level product of the residual feature r and the first scale factor "scale". That is, the residual feature r is multiplied by the value for modification in the corresponding channel vector of the first scale factor "scale".

From the above, it can be seen that the first scale factor "scale" is a modification parameter for the residual feature r. The first scale factor "scale" is used to modify the residual feature r to make the modified residual feature r' more accurate and reliable. The first scale factor "scale" can be pre-configured or trained, and the source of the first scale factor "scale" is not limited.

After obtaining the residual feature r', the encoding end can quantize the residual feature r' to obtain the residual quantized feature corresponding to the residual feature r'. The Q operation in FIG. 4 represents the quantization process. After obtaining the residual quantized feature corresponding to the residual feature r', the encoding end can encode the residual quantized feature to obtain the Bitstream #2 (i.e., the second bitstream) corresponding to the current block. The AE operation in FIG. 4 represents the encoding process, such as the entropy encoding process. Alternatively, the encoding end can directly encode the residual feature r' to obtain the Bitstream #2 corresponding to the current block, without involving the quantization process of the residual feature r'.

After obtaining the Bitstream #2 corresponding to the current block, the encoding end can transmit the Bitstream #2 corresponding to the current block to the decoding end. The processing procedure of the decoding end for the Bitstream #2 corresponding to the current block is referred to the subsequent embodiments.

After obtaining the corresponding Bitstream #2 for the current block, the encoding end can further decode Bitstream #2 to obtain residual quantized feature. The AD in FIG. 4 represents the decoding process. Then, the encoding end can perform inverse quantization on the residual quantized feature to obtain the modified residual feature r'_hat, where the modified residual feature r'_hat can be the same or different from the residual feature r'. The IQ operation in FIG. 4 represents the inverse quantization process. Alternatively, after obtaining the Bitstream #2 corresponding to the current block, the encoding end can also decode Bitstream #2 to obtain the modified residual feature r'_hat, without involving the inverse quantization process of the residual feature.

After obtaining the modified residual feature r'_hat, the encoding end can modify the modified residual feature r'_hat to obtain the unmodified residual feature r_hat, where the residual feature r_hat can be the same or different from the residual feature r. For example, the encoding end modifies the residual feature r'_hat based on the first scale factor to obtain the unmodified residual feature r_hat. For example, the IG-Unit operation can be a scaling operation, and the encoding end can perform a scaling operation on the residual feature r'_hat based on the first scale factor (i.e., calculate the quotient of the residual feature r'_hat and the first scale factor) to obtain the unmodified residual feature r_hat. The IG-Unit process can be understood as the inverse process of the G-Unit process, and is configured to modify the residual feature r'_hat to the residual feature r_hat.

After obtaining the residual feature r_hat, the encoding end determines the picture feature y_hat based on the residual feature r_hat and the mean mu. The picture feature y_hat and the picture feature y can be the same or different. For example, the sum of the residual feature r_hat and the mean mu is taken as the picture feature y_hat. After obtaining the picture feature y_hat, the picture feature y_hat can be synthesized and transformed to obtain the reconstructed picture block x_hat corresponding to the current block x. Such that, the picture reconstruction process is completed, and the reconstructed picture block x_hat is obtained.

In an embodiment, when encoding the residual quantized feature or residual feature r' to obtain the Bitstream #2 corresponding to the current block, the encoding end needs to first determine the probability distribution model, and then encode the residual quantized feature or residual feature r' based on the probability distribution model. In addition, when decoding Bitstream #2, the encoding end also needs to first determine the probability distribution model, and then decode Bitstream #2 based on the probability distribution model.

To obtain a probability distribution model, the probability distribution model is related to the mean and standard deviation. If the mean of the probability distribution model is 0, only the standard deviation of the probability distribution model needs to be determined, and then the probability distribution model is determined based on the standard deviation. If the mean of the probability distribution model is not 0, the mean and standard deviation of the probability distribution model need to be determined, and then the probability distribution model is determined based on the mean and standard deviation. There is no limitation on how to determine the probability distribution model in the embodiments.

To obtain the standard deviation of the probability distribution model, as shown in FIG. 4, after obtaining the initial coefficient hyperparameter feature z_hat, the encoding end performs coefficient hyperparameter feature inverse transformation on the initial coefficient hyperparameter feature z_hat to obtain the standard deviation o, and then determines the probability distribution model N (0, $\sigma$) based on the standard deviation, where the mean of the probability distribution model is 0 as an example. If the mean of the probability distribution model is not 0, it is also necessary to determine the mean of the probability distribution model. For example, the initial coefficient hyperparameter feature z_hat can be input to a hyperscale decoding network. The hyperscale decoding network performs coefficient hyperparameter feature inverse transformation on the initial coefficient hyperparameter feature z_hat to obtain the standard deviation. The hyperscale decoding network can be a trained neural network. The training process of the hyperscale decoding network is not limited, as long as the hyperscale decoding network can perform coefficient hyperparameter feature inverse transformation on the initial coefficient hyperparameter feature z_hat.

In an embodiment, the processing of the encoding end described above is performed by a deep learning model or a neural network model, thereby achieving end-to-end picture compression and encoding processes, which is not limited.

Figure 6:
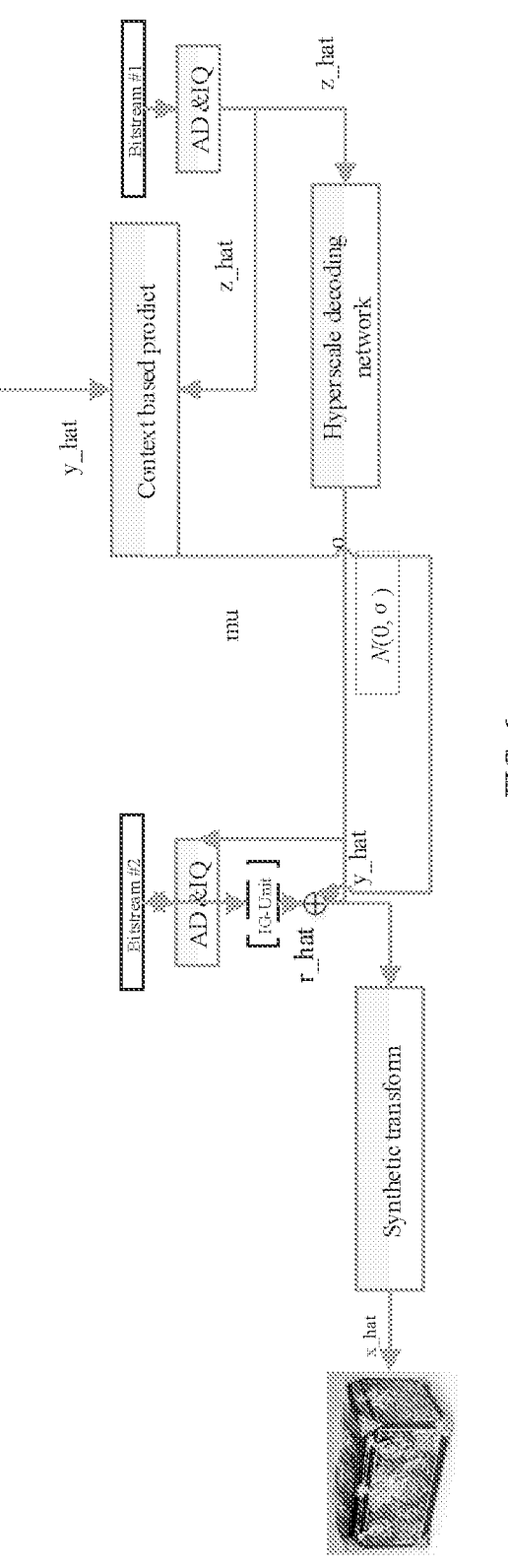
FIG. 6 is a schematic diagram of a processing procedure of a decoding end according to an embodiment of the present disclosure.

Embodiment 4: for Embodiment 1 and Embodiment 2, the processing procedure of the decoding end can be seen in FIG. 6. FIG. 6 is only an example of the processing procedure of the decoding end, which is not limited.

After obtaining the Bitstream #1 corresponding to the current block, the decoding end can decode Bitstream #1 to obtain hyperparameter quantized feature. AD in FIG. 6 represents the decoding process. Then, the hyperparameter quantized feature are inverse quantized to obtain the initial coefficient hyperparameter feature z_hat, where the initial coefficient hyperparameter feature z_hat can be the same or different from the initial coefficient hyperparameter feature z. The IQ operation in FIG. 6 represents the inverse quantization process. Alternatively, after obtaining the Bitstream #1 corresponding to the current block, the decoding end can also decode Bitstream #1 to obtain the initial coefficient hyperparameter feature z_hat, without involving the inverse quantization process.

After obtaining the initial coefficient hyperparameter feature z_hat, the decoding end can perform context-based prediction based on the initial coefficient hyperparameter feature z_hat of the current block and the residual feature y_hat of the previous picture block (the determination of the residual feature y_hat is described in the subsequent embodiments), and obtain the mean mu corresponding to the current block. The prediction process is not limited. Where for the context-based prediction process, the input includes the initial coefficient hyperparameter feature z_hat and the decoded residual feature y_hat, where the initial coefficient hyperparameter feature z_hat and the decoded residual feature y_hat are jointly input to obtain a more accurate mean mu. The mean mu is used to be subtracted from the original feature to obtain the residual and to be added to the decoded residual to obtain the reconstructed y.

After obtaining the corresponding Bitstream #2 for the current block, the decoding end can further decode Bitstream #2 to obtain residual quantized feature. The AD in FIG. 6 represents the decoding process. Then, the decoding end can perform inverse quantization on the residual quantized feature to obtain the modified residual feature r'_hat, where the modified residual feature r'_hat can be the same or different from the residual feature r'. The IQ operation in FIG. 6 represents the inverse quantization process. Alternatively, after obtaining the Bitstream #2 corresponding to the current block, the decoding end can also decode Bitstream #2 to obtain the modified residual feature r'_hat, without involving the inverse quantization process of the residual feature.

After obtaining the modified residual feature r'_hat, the decoding end can modify the modified residual feature r'_hat to obtain the unmodified residual feature r_hat, where the residual feature r_hat can be the same or different from the residual feature r. For example, the decoding end modifies the residual feature r'_hat based on the first scale factor to obtain the unmodified residual feature r_hat. For example, the IG-Unit operation can be a scaling operation, and the decoding end can perform a scaling operation on the residual feature r'_hat based on the first scale factor (i.e., calculate the quotient of the residual feature r'_hat and the first scale factor) to obtain the unmodified residual feature r_hat. The IG-Unit process can be understood as the inverse process of the G-Unit process, and is configured to modify the residual feature r'_hat to the residual feature r_hat.

After obtaining the residual feature r_hat, the decoding end determines the picture feature y_hat based on the residual feature r_hat and the mean mu. The picture feature y_hat and the picture feature y can be the same or different. For example, the sum of the residual feature r_hat and the mean mu is taken as the picture feature y_hat. After obtaining the picture feature y_hat, the picture feature y_hat can be synthesized and transformed to obtain the reconstructed picture block x_hat corresponding to the current block x. Such that, the picture reconstruction process is completed, and the reconstructed picture block x_hat is obtained.

When decoding Bitstream #2, the decoding end needs to first determine the probability distribution model, and then decode Bitstream #2 based on the probability distribution model. To obtain a probability distribution model, the probability distribution model is related to the mean and standard deviation. If the mean of the probability distribution model is 0, only the standard deviation of the probability distribution model needs to be determined, and then the probability distribution model is determined based on the standard deviation. If the mean of the probability distribution model is not 0, the mean and standard deviation of the probability distribution model need to be determined, and then the probability distribution model is determined based on the mean and standard deviation. There is no limitation on how to determine the probability distribution model in the embodiments.

To obtain the standard deviation of the probability distribution model, as shown in FIG. 6, after obtaining the initial coefficient hyperparameter feature z_hat, the decoding end performs coefficient hyperparameter feature inverse transformation on the initial coefficient hyperparameter feature z_hat to obtain the standard deviation o, and then determines the probability distribution model N (0, σ) based on the standard deviation, where the mean of the probability distribution model is 0 as an example. If the mean of the probability distribution model is not 0, it is also necessary to determine the mean of the probability distribution model. For example, the initial coefficient hyperparameter feature z_hat can be input to a hyperscale decoding network. The hyperscale decoding network performs coefficient hyperparameter feature inverse transformation on the initial coefficient hyperparameter feature z_hat to obtain the standard deviation. The hyperscale decoding network can be a trained neural network. The training process of the hyperscale decoding network is not limited, as long as the hyperscale decoding network can perform coefficient hyperparameter feature inverse transformation on the initial coefficient hyperparameter feature z_hat.

In an embodiment, the processing of the decoding end described above is performed by a deep learning model or a neural network model, thereby achieving end-to-end picture decompression and decoding processes, which is not limited.

Embodiment 5: for Embodiment 3, to match the probability distribution model with the G-Unit process when determining the probability distribution model, that is, the probability distribution model can perceive the scaling effect of the G-Unit process on the residual feature, such that there is no significant deviation between the probability distribution model and the actual residual feature to be encoded. Then, in this embodiment, the encoding end can further obtain the target probability distribution model corresponding to the first scale factor (i.e., the first scale factor used in the G-Unit process). That is, the probability distribution model is modified based on the first scale factor to obtain the modified target probability distribution model. The residual quantized feature or residual feature r' is encoded based on the target probability distribution model, and Bitstream #2 is decoded based on the target probability distribution model.

Figure 7:
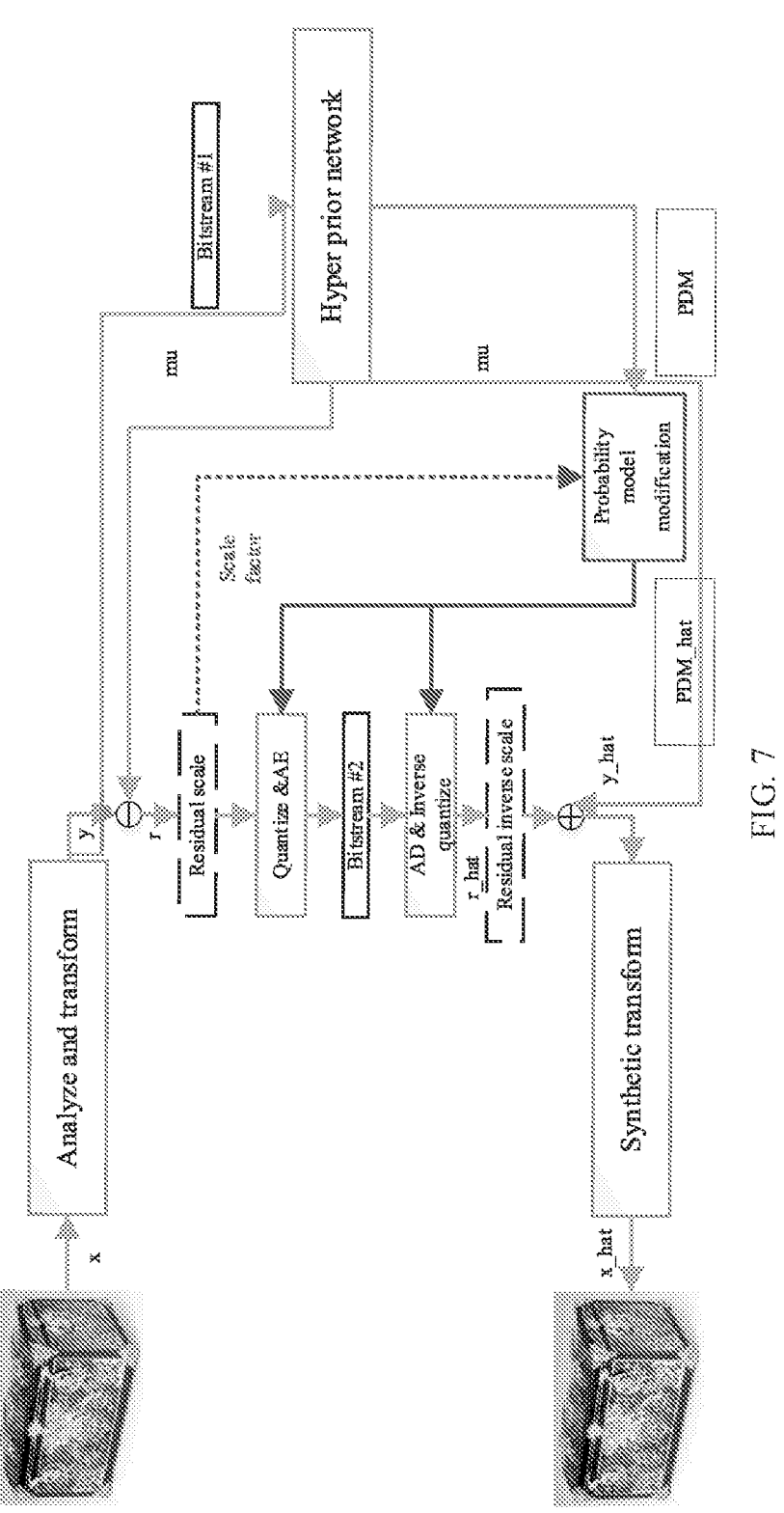
FIG. 7 is a schematic diagram of a processing procedure of an encoding end according to an embodiment of the present disclosure.

For example, as shown in FIG. 7, after obtaining the current block x, the encoding end can perform feature transformation on the current block x (i.e., analyze and transform the current block x) to obtain the picture feature y corresponding to the current block x. After obtaining the picture feature y, the encoding end performs coefficient hyperparameter feature transformation on the picture feature y to obtain the initial coefficient hyperparameter feature z. After obtaining the initial coefficient hyperparameter feature z, the encoding end can quantize the initial coefficient hyperparameter feature z to obtain the hyperparameter quantized feature corresponding to the initial coefficient hyperparameter feature z, and encode the hyperparameter quantized feature to obtain Bitstream #1 (i.e., the first bitstream) corresponding to the current block. Alternatively, the encoding end can directly encode the initial coefficient hyperparameter feature z to obtain the Bitstream #1 corresponding to the current block.

After obtaining the corresponding Bitstream #1 of the current block, the encoding end can further decode Bitstream #1 to obtain hyperparameter quantized feature, and perform inverse quantization on the hyperparameter quantized feature to obtain the initial coefficient hyperparameter feature z_hat. Alternatively, the encoding end can also decode Bitstream #1 to obtain the initial coefficient hyperparameter feature z_hat without involving the inverse quantization process.

After obtaining the initial coefficient hyperparameter feature z_hat, the encoding end can perform context-based prediction based on the initial coefficient hyperparameter feature z_hat of the current block and the residual feature y_hat of the previous picture block to obtain the mean mu corresponding to the current block.

After obtaining the picture feature y, the encoding end determines the residual feature r based on the picture feature y and the mean mu. The encoding end modifies the residual feature r to obtain the modified residual feature r', which is the residual scaling process in FIG. 7.

After obtaining the residual feature r', the encoding end can quantize the residual feature r' to obtain the residual quantized feature corresponding to the residual feature r', encode the residual quantized feature to obtain the Bitstream #2 (i.e., the second bitstream) corresponding to the current block. Alternatively, the encoding end can directly encode the residual feature r' to obtain the Bitstream #2 corresponding to the current block.

After obtaining the Bitstream #2 corresponding to the current block, the encoding end can further decode the Bitstream #2 to obtain residual quantized feature, and perform inverse quantization on the residual quantized feature to obtain the modified residual feature r'_hat. Alternatively, after obtaining the Bitstream #2 corresponding to the current block, the encoding end can decode the Bitstream #2 to obtain the modified residual feature r'_hat.

After obtaining the modified residual feature r'_hat, the encoding end can modify the modified residual feature r'_hat to obtain the unmodified residual feature r_hat, which is the residual inverse scaling process shown in FIG. 7.

After obtaining the residual feature r_hat, the encoding end determines the picture feature y_hat based on the residual feature r_hat and the mean mu, and synthesizes and transforms the picture feature y_hat to obtain the reconstructed picture block x_hat corresponding to the current block x.

In an embodiment, when encoding the residual quantized feature or residual feature r' to obtain the Bitstream #2 corresponding to the current block, the encoding end needs to first determine the probability distribution model, and then encode the residual quantized feature or residual feature r' based on the probability distribution model. When decoding Bitstream #2, the encoding end also needs to first determine the probability distribution model, and then decode Bitstream #2 based on the probability distribution model.

In this embodiment, to match the probability distribution model with the G-Unit process, i.e., the probability distribution model can perceive the scaling effect of the G-Unit process on the residual feature, such that there is no significant deviation between the probability distribution model and the actual residual feature to be encoded, the probability distribution model PDM can be modified to obtain the modified probability distribution model PDM_hat, where the modified probability distribution model PDM_hat can be referred to as the target probability distribution model. To match the probability distribution model with the G-Unit process, the first scale factor (i.e., the scale factor of the G-Unit process) can be used to modify the probability distribution model PDM to obtain the modified target probability distribution model PDM_hat.

In this embodiment, as shown in FIG. 7, the input of the probability model modification module mainly includes the first scale factor "scale" for the residual feature at the encoding end and the original probability distribution model determined by decoding Bitstream #1, and the output is the modified target probability distribution model PDM_hat. The main purpose of the probability model modification module is to optimize the probability distribution model of entropy encoding of Bitstream #2. By modifying the probability distribution parameter of the probability distribution model, the bit rate of the encoded bitstream becomes smaller. For example, by modifying the probability distribution model PDM output by the hyperprior network, the probability distribution model can perceive all scaling changes of the residual feature at the encoding end, and jointly transmit the scale factor of the residual feature and the probability distribution model decoded from Bitstream #2 to the probability model modification module, and the new target probability distribution model PDM_hat is output. Compared with the previous probability distribution model, the target probability distribution model PDM_hat describes the distribution of the residual feature more accurately, which can achieve the goal of reducing the bit rate.

For example, since the target probability distribution model PDM_hat is determined based on probability distribution parameter such as mean and/or standard deviation, the target probability distribution parameter corresponding to the first scale factor can be obtained, and the target probability distribution model PDM_hat corresponding to the first scale factor can be determined based on the target probability distribution parameter. For example, the first scale factor can be used to modify the initial probability distribution parameter to obtain the modified target probability distribution parameter.

For example, the probability distribution model is related to the mean and standard deviation. If the mean of the probability distribution model is 0, it is only necessary to determine the standard deviation for the probability distribution model, and then determine the probability distribution model based on the standard deviation. In this case, the target standard deviation corresponding to the first scale factor can be obtained. For example, the first scale factor can be used to modify the initial standard deviation to obtain the modified target standard deviation, and then the target probability distribution model PDM_hat corresponding to the first scale factor can be determined based on the target standard deviation.

For example, if the mean of the probability distribution model is not 0, it is necessary to determine the mean and standard deviation of the probability distribution model, and then determine the probability distribution model based on the mean and standard deviation. In this case, the target mean and target standard deviation corresponding to the first scale factor can be obtained. For example, the first scale factor can be used to modify the initial mean to obtain the modified target mean, and the first scale factor can be used to modify the initial standard deviation to obtain the modified target standard deviation. Then, based on the target mean and target standard deviation, the target probability distribution model PDM_hat corresponding to the first scale factor can be determined.

For example, if the mean of the probability distribution model is not 0, but the standard deviation of the probability distribution model is 0, it is necessary to determine the mean of the probability distribution model, and then determine the probability distribution model based on the mean. In this case, the target mean corresponding to the first scale factor can be obtained. For example, the first scale factor can be used to modify the initial mean to obtain the modified target mean, and then the target probability distribution model PDM_hat corresponding to the first scale factor can be determined based on the target mean.

For example, to obtain the mean of the probability distribution model, context-based prediction can be performed based on the initial coefficient hyperparameter feature z_hat of the current block and the residual feature y_hat of the previous picture block to obtain the mean mu corresponding to the current block.

For example, to obtain the standard deviation of the probability distribution model, after obtaining the initial coefficient hyperparameter feature z_hat, the coefficient hyperparameter feature inverse transformation is performed on the initial coefficient hyperparameter feature z_hat to obtain the standard deviation σ corresponding to the current block.

For example, the encoding end can obtain the target probability distribution parameter corresponding to the first scale factor, and determine the target probability distribution model corresponding to the first scale factor based on the target probability distribution parameter. For example, the encoding end can modify the initial probability distribution parameter based on the first scale factor to obtain the target probability distribution parameter corresponding to the first scale factor.

In an embodiment, the target probability distribution parameter may include but is not limited to the target mean and/or target standard deviation. The target mean and target standard deviation are only examples, which are not limited.

For example, if the target probability distribution parameter is the target standard deviation, the encoding end can decode the first bitstream to obtain the initial coefficient hyperparameter feature corresponding to the current block, perform coefficient hyperparameter feature inverse transformation on the initial coefficient hyperparameter feature to obtain the initial standard deviation, and modify, based on the first scale factor, the initial standard deviation to obtain the target standard deviation.

For example, the encoding end can generate a target scale factor based on the first scale factor, and modify the initial standard deviation based on the target scale factor to obtain the target standard deviation. For example, the product of the target scale factor and the initial standard deviation can be taken as the target standard deviation. The target scale factor can be the first scale factor. Alternatively, the target scale factor can be determined based on the first scale factor and the second scale factor. For example, the target scale factor can be determined based on the product of the first scale factor and the second scale factor, or by adding a bias value to the product of the first scale factor and the second scale factor.

The second scale factor is used to represent the mapping relationship between the residual and the standard deviation. For example, the residual and the standard deviation are numerical values of different magnitudes. By using the second scale factor, the magnitude of the standard deviation can be adjusted to the magnitude of the residual. That is, the second scale factor can be used as an adjustment coefficient to modify the magnitude of the standard deviation to the magnitude of the residual, thereby adjusting the residual and the standard deviation to the same magnitude for operation, such that the residual and standard deviation can better match the operation and improve the accuracy of the operation.

For example, if the target probability distribution parameter is the target standard deviation, the encoding end can decode the first bitstream to obtain the initial coefficient hyperparameter feature corresponding to the current block, modify the initial coefficient hyperparameter feature based on the first scale factor to obtain the target coefficient hyperparameter feature, and perform coefficient hyperparameter feature inverse transformation on the target coefficient hyperparameter feature to obtain the target standard deviation.

For example, the encoding end can generate a target scale factor based on the first scale factor, and modify the initial coefficient hyperparameter feature based on the target scale factor to obtain the target coefficient hyperparameter feature. For example, the encoding end can take the product of the target scale factor and the initial coefficient hyperparameter feature as the target coefficient hyperparameter feature. The target scale factor can be the first scale factor. Alternatively, the target scale factor can be determined based on the first scale factor and the third scale factor. For example, the target scale factor can be determined based on the product of the first scale factor and the third scale factor, or by adding a bias value to the product of the first scale factor and the third scale factor. The third scale factor is used to represent the mapping relationship between the residual and coefficient hyperparameter feature. For example, the residual and the coefficient hyperparameter feature are numerical values of different magnitudes. By using the third scale factor, the magnitude of the coefficient hyperparameter feature can be adjusted to the magnitude of the residual. That is, the third scale factor can be used as an adjustment coefficient to modify the magnitude of the coefficient hyperparameter feature to the magnitude of the residual, thereby adjusting the residual and coefficient hyperparameter feature to the same magnitude for operation, such that the residual and coefficient hyperparameter feature can better match the operation and improve the accuracy of the operation.

For example, when the target probability distribution parameter is the target mean, then the encoding end can perform context-based prediction based on the initial coefficient hyperparameter feature z_hat of the current block and the residual feature y_hat of the previous picture block to obtain the initial mean corresponding to the current block, and modify the initial mean based on the first scale factor to obtain the target mean.

For example, the encoding end can generate a target scale factor based on the first scale factor, and modify the initial mean based on the target scale factor to obtain the target mean. For example, the product of the target scale factor and the initial mean can be used as the target mean. The target scale factor can be the first scale factor. Alternatively, the target scale factor can be determined based on the first scale factor and the second scale factor. For example, the target scale factor can be determined based on the product of the first scale factor and the second scale factor, or by adding a bias value to the product of the first scale factor and the second scale factor.

The second scale factor is used to represent the mapping relationship between the residual and the mean. For example, the residual and the mean are numerical values of different magnitudes. By using the second scale factor, the magnitude of the mean can be adjusted to the magnitude of the residual. That is, the second scale factor can be used as an adjustment coefficient to modify the magnitude of the mean to the magnitude of the residual, thereby adjusting the residual and the mean to the same magnitude for operation, such that the residual and mean can better match the operation and improve the accuracy of the operation.

Embodiment 6: for Embodiment 4, when determining the probability distribution model, the decoding end can obtain the target probability distribution model corresponding to the first scale factor (i.e., the first scale factor used in the G-Unit process) to match the probability distribution model with the G-Unit process, that is, the probability distribution model can perceive the scaling effect of the G-Unit process on the residual feature, such that there is no significant deviation between the probability distribution model and the actual residual feature to be encoded. Based on the first scale factor, the probability distribution model is modified to obtain the modified target probability distribution model, and Bitstream #2 is decoded based on the target probability distribution model.

For example, after obtaining the corresponding Bitstream #1 of the current block, the decoding end can further decode Bitstream #1 to obtain hyperparameter quantized feature, and perform inverse quantization on the hyperparameter quantized feature to obtain the initial coefficient hyperparameter feature z_hat. Alternatively, the decoding end can also decode Bitstream #1 to obtain the initial coefficient hyperparameter feature z_hat without involving the inverse quantization process.

After obtaining the initial coefficient hyperparameter feature z_hat, the decoding end can perform context-based prediction based on the initial coefficient hyperparameter feature z_hat of the current block and the residual feature y_hat of the previous picture block to obtain the mean mu corresponding to the current block.

After obtaining the Bitstream #2 corresponding to the current block, the decoding end can further decode the Bitstream #2 to obtain residual quantized feature, and perform inverse quantization on the residual quantized feature to obtain the modified residual feature r'_bat. Alternatively, after obtaining the Bitstream #2 corresponding to the current block, the decoding end can decode the Bitstream #2 to obtain the modified residual feature r'_hat.

After obtaining the modified residual feature r'_hat, the decoding end can modify the modified residual feature r'_hat to obtain the unmodified residual feature r_hat, which is the residual inverse scaling process shown in FIG. 7.

After obtaining the residual feature r_hat, the decoding end determines the picture feature y_hat based on the residual feature r_hat and the mean mu, and synthesizes and transforms the picture feature y_hat to obtain the reconstructed picture block x_hat corresponding to the current block x.

In an embodiment, when decoding Bitstream #2, the decoding end needs to first determine the probability distribution model, and then decode Bitstream #2 based on the probability distribution model. To match the probability distribution model with the G-Unit process, i.e., the probability distribution model can perceive the scaling effect of the G-Unit process on the residual feature, such that there is no significant deviation between the probability distribution model and the actual residual feature to be encoded, the probability distribution model PDM can be modified to obtain the modified probability distribution model PDM_hat, where the probability distribution model PDM_hat can be referred to as the target probability distribution model. To match the probability distribution model with the G-Unit process, the first scale factor (i.e., the scale factor of the G-Unit process) can be used to modify the probability distribution model PDM to obtain the modified target probability distribution model PDM_hat.

In this embodiment, the input of the probability model modification module mainly includes the first scale factor "scale" for the residual feature at the decoding end and the original probability distribution model determined by decoding Bitstream #1, and the output is the modified target probability distribution model PDM_hat. The main purpose of the probability model modification module is to optimize the probability distribution model of entropy encoding of Bitstream #2. By modifying the probability distribution parameter of the probability distribution model, the bit rate of the encoded bitstream becomes smaller. For example, by modifying the probability distribution model PDM output by the hyperprior network, the probability distribution model can perceive all scaling changes of the residual feature at the decoding end, and jointly transmit the scale factor of the residual feature and the probability distribution model decoded from Bitstream #2 to the probability model modification module, and the new target probability distribution model PDM_hat is output. Compared with the previous probability distribution model, the target probability distribution model PDM_hat describes the distribution of the residual feature more accurately, which can achieve the goal of reducing the bit rate.

For example, since the target probability distribution model PDM_hat is determined based on probability distribution parameter such as mean and/or standard deviation, the target probability distribution parameter corresponding to the first scale factor can be obtained, and the target probability distribution model PDM_hat corresponding to the first scale factor can be determined based on the target probability distribution parameter. For example, the first scale factor can be used to modify the initial probability distribution parameter to obtain the modified target probability distribution parameter.

For example, the probability distribution model is related to the mean and standard deviation. If the mean of the probability distribution model is 0, it is only necessary to determine the standard deviation for the probability distribution model, and then determine the probability distribution model based on the standard deviation. In this case, the target standard deviation corresponding to the first scale factor can be obtained. For example, the first scale factor can be used to modify the initial standard deviation to obtain the modified target standard deviation, and then the target probability distribution model PDM_hat corresponding to the first scale factor can be determined based on the target standard deviation.

For example, if the mean of the probability distribution model is not 0, it is necessary to determine the mean and standard deviation of the probability distribution model, and then determine the probability distribution model based on the mean and standard deviation. In this case, the target mean and target standard deviation corresponding to the first scale factor can be obtained. For example, the first scale factor can be used to modify the initial mean to obtain the modified target mean, and the first scale factor can be used to modify the initial standard deviation to obtain the modified target standard deviation. Then, based on the target mean and target standard deviation, the target probability distribution model PDM_hat corresponding to the first scale factor can be determined.

For example, if the mean of the probability distribution model is not 0, but the standard deviation of the probability distribution model is 0, it is necessary to determine the mean of the probability distribution model, and then determine the probability distribution model based on the mean. In this case, the target mean corresponding to the first scale factor can be obtained. For example, the first scale factor can be used to modify the initial mean to obtain the modified target mean, and then the target probability distribution model PDM_hat corresponding to the first scale factor can be determined based on the target mean.

For example, to obtain the mean of the probability distribution model, context-based prediction can be performed based on the initial coefficient hyperparameter feature z_hat of the current block and the residual feature y_hat of the previous picture block to obtain the mean mu corresponding to the current block.

For example, to obtain the standard deviation of the probability distribution model, after obtaining the initial coefficient hyperparameter feature z_hat, the coefficient hyperparameter feature inverse transformation is performed on the initial coefficient hyperparameter feature z_hat to obtain the standard deviation corresponding to the current block.

For example, the decoding end can obtain the target probability distribution parameter corresponding to the first scale factor, and determine the target probability distribution model corresponding to the first scale factor based on the target probability distribution parameter. For example, the decoding end can modify the initial probability distribution parameter based on the first scale factor to obtain the target probability distribution parameter corresponding to the first scale factor.

In an embodiment, the target probability distribution parameter may include but is not limited to the target mean and/or target standard deviation. The target mean and target standard deviation are only examples, which are not limited.

For example, if the target probability distribution parameter is the target standard deviation, the decoding end can decode the first bitstream to obtain the initial coefficient hyperparameter feature corresponding to the current block, perform coefficient hyperparameter feature inverse transformation on the initial coefficient hyperparameter feature to obtain the initial standard deviation, and modify, based on the first scale factor, the initial standard deviation to obtain the target standard deviation.

For example, the decoding end can generate a target scale factor based on the first scale factor, and modify the initial standard deviation based on the target scale factor to obtain the target standard deviation. For example, the product of the target scale factor and the initial standard deviation can be taken as the target standard deviation. The target scale factor can be the first scale factor. Alternatively, the target scale factor can be determined based on the first scale factor and the second scale factor. For example, the target scale factor can be determined based on the product of the first scale factor and the second scale factor, or by adding a bias value to the product of the first scale factor and the second scale factor.

The second scale factor is used to represent the mapping relationship between the residual and the standard deviation. For example, the residual and the standard deviation are numerical values of different magnitudes. By using the second scale factor, the magnitude of the standard deviation can be adjusted to the magnitude of the residual. That is, the second scale factor can be used as an adjustment coefficient to modify the magnitude of the standard deviation to the magnitude of the residual, thereby adjusting the residual and the standard deviation to the same magnitude for operation, such that the residual and standard deviation can better match the operation and improve the accuracy of the operation.

The second scale factor can be pre-configured. Alternatively, the second scale factor can be obtained by decoding from the bitstream corresponding to the current block, such as decoding from the first bitstream corresponding to the current block to obtain the second scale factor, or decoding from the second bitstream corresponding to the current block to obtain the second scale factor, or decoding from other streams, which is not limited.

For example, if the target probability distribution parameter is the target standard deviation, the decoding end can decode the first bitstream to obtain the initial coefficient hyperparameter feature corresponding to the current block, modify the initial coefficient hyperparameter feature based on the first scale factor to obtain the target coefficient hyperparameter feature, and perform coefficient hyperparameter feature inverse transformation on the target coefficient hyperparameter feature to obtain the target standard deviation.

For example, the decoding end can generate a target scale factor based on the first scale factor, and modify the initial coefficient hyperparameter feature based on the target scale factor to obtain the target coefficient hyperparameter feature. For example, the decoding end can take the product of the target scale factor and the initial coefficient hyperparameter feature as the target coefficient hyperparameter feature. The target scale factor can be the first scale factor. Alternatively, the target scale factor can be determined based on the first scale factor and the third scale factor. For example, the target scale factor can be determined based on the product of the first scale factor and the third scale factor, or by adding a bias value to the product of the first scale factor and the third scale factor. The third scale factor is used to represent the mapping relationship between the residual and coefficient hyperparameter feature. For example, the residual and the coefficient hyperparameter feature are numerical values of different magnitudes. By using the third scale factor, the magnitude of the coefficient hyperparameter feature can be adjusted to the magnitude of the residual. That is, the third scale factor can be used as an adjustment coefficient to modify the magnitude of the coefficient hyperparameter feature to the magnitude of the residual, thereby adjusting the residual and coefficient hyperparameter feature to the same magnitude for operation, such that the residual and coefficient hyperparameter feature can better match the operation and improve the accuracy of the operation.

The third scale factor can be pre-configured. Alternatively, the third scale factor can be obtained by decoding from the bitstream corresponding to the current block, such as decoding from the first bitstream corresponding to the current block to obtain the third scale factor, or decoding from the third bitstream corresponding to the current block to obtain the third scale factor, or decoding from other streams, which is not limited.

For example, when the target probability distribution parameter is the target mean, then the decoding end can perform context-based prediction based on the initial coefficient hyperparameter feature z_hat of the current block and the residual feature y_hat of the previous picture block to obtain the initial mean corresponding to the current block, and modify the initial mean based on the first scale factor to obtain the target mean.

For example, the decoding end can generate a target scale factor based on the first scale factor, and modify the initial mean based on the target scale factor to obtain the target mean. For example, the product of the target scale factor and the initial mean can be used as the target mean. The target scale factor can be the first scale factor Alternatively, the target scale factor can be determined based on the first scale factor and the second scale factor. For example, the target scale factor can be determined based on the product of the first scale factor and the second scale factor, or by adding a bias value to the product of the first scale factor and the second scale factor.

The second scale factor is used to represent the mapping relationship between the residual and the mean. For example, the residual and the mean are numerical values of different magnitudes. By using the second scale factor, the magnitude of the mean can be adjusted to the magnitude of the residual. That is, the second scale factor can be used as an adjustment coefficient to modify the magnitude of the mean to the magnitude of the residual, thereby adjusting the residual and the mean to the same magnitude for operation, such that the residual and mean can better match the operation and improve the accuracy of the operation.

The second scale factor can be pre-configured. Alternatively, the second scale factor can be obtained by decoding from the bitstream corresponding to the current block, such as decoding from the first bitstream corresponding to the current block to obtain the second scale factor, or decoding from the second bitstream corresponding to the current block to obtain the second scale factor, or decoding from other streams, which is not limited.

Embodiment 7: as shown in FIG. 8, which is a flowchart of the decoding method, the decoding end can receive Bitstream #1 (i.e., the first bitstream) and Bitstream #2 (i.e., the second Bitstream). The decoding end can decode Bitstream #1 to obtain the initial coefficient hyperparameter feature z_hat. Based on the initial coefficient hyperparameter feature z_hat, the standard deviations of all feature points can be extracted, that is, the initial standard deviations σ of all feature points can be obtained. After the initial standard deviation is modified by a probability model, the modified target standard deviation σ_hat can be obtained.

The decoding end can generate a target probability distribution model PDM_hat based on the target standard deviation, and decode Bitstream #2 based on the target probability distribution model PDM_hat to obtain the residual feature corresponding to the current block. For example, during the entire decoding process, the parameter of the target probability distribution model PDM_hat for each residual is assumed to be a distribution with $\sigma\_hat^2$ as the variance, where the distribution is used for entropy decoding of Bitstream #2 to obtain the residual feature r_hat. Therefore, the decoding end can decode Bitstream #2 based on the target probability distribution model PDM_hat to obtain the residual feature r_hat corresponding to the current block.

The decoding end can decode Bitstream #1 to obtain the initial coefficient hyperparameter feature z_hat Based on the initial coefficient hyperparameter feature z_hat, the mean of the current point can be extracted, and the residual feature r_hat can be added to the mean to obtain the reconstructed value y_hat.

Embodiment 8: for the encoding end, the encoding method may include: determining a zero-mean Gaussian distribution $N (0, \sigma^2)$, where the zero-mean Gaussian distribution can be the target probability distribution model; and obtaining the residual feature r_hat by performing arithmetic encoding and decoding on the second bitstream (Bitstream #2). The encoding end will adaptively learn a probability distribution for each feature point based on the picture content. The selection of the probability distribution model is determined as hyperparameters before training, and can be Gaussian distribution, or mixture Gaussian, etc., which is not limited. For example, assuming that each feature point follows a normal distribution with zero mean and variance of $\sigma^2$, to estimate the distribution of each feature point, it is necessary to learn one parameter σ for each parameter, i.e., the initial standard deviation. The relevant information of the initial standard deviation will be written into Bitstream #1 in the hyper prior network. In this embodiment, the initial standard deviation can be synchronously modified based on the first scale factor. Therefore, when using the target probability distribution model to predict entropy encoding and decoding, the target standard deviation σ_hat also needs to be obtained through the probability model modification module. The target probability distribution model can be represented as $p=N(0, \sigma\_hat)$, that is, the target probability distribution model is related to the mean 0 and the target standard deviation σ_hat.

For example, since the entropy model is not fixed, both the encoding and decoding ends need to know the probability distribution model parameter o of each feature point, and the information relevant to σ needs to be transmitted to the decoding end. Accurate modeling can reduce the bit rate of latent domain features.

Embodiment 9: during the encoding process, the residual feature r undergoes various scaling processes, such as G-unit scaling, which can cause changes in the distribution of the residual feature r. However, in the entire encoding and decoding framework, the input parameter of the generation network of the initial standard deviation σ is the original feature y in the latent domain. In this process, the initial standard deviation σ cannot perceive the changes in the residual, resulting in a deviation between the distribution described by the initial standard deviation σ and the true distribution of the residual. To make the initial standard deviation σ synchronously perceive the changes of the residual, a probability model modification module is provided after the initial standard deviation σ, aiming to map the changes in the residual to the initial standard deviation σ. As shown in FIG. 9A, the input is the initial standard deviation σ and the first scale factor "scale" (i.e., the first scale factor of the G-unit process), and the output is the target standard deviation σ_hat. Obviously, the target standard deviation σ_hat can be determined based on the initial standard deviation σ and the first scale factor "scale". For example, the product of the initial standard deviation σ and the first scale factor "scale" is the target standard deviation σ_hat.

In Embodiment 9, the mapping relationship adopts a 1:1 scaling relationship, that is, the first scale factor of G-Unit is operated on the initial standard deviation σ in the same way once to generate the target standard deviation σ_hat, as shown in the following formula σ_hat=Scale*σ. In this way, the distribution of the residual can be predicted using the target probability distribution model N~(0, σ_hat). Where the first scale factor "Scale" can be obtained through training, or can be obtained through other methods without training, which is not limited.

Embodiment 10: based on the scaling strategy of the initial standard deviation σ in Embodiment 9, in Embodiment 10, not only the numerical scaling of the residual feature res at the encoding end is considered, but also the difference in physical meaning between the residual feature and the initial standard deviation σ itself is taken into account. For example, as shown in FIG. 9B, the input of the probability model modification module not only includes the initial standard deviation σ and the first scale factor "scale" (i.e., the first scale factor of the G-unit process), but also includes a second scale factor scale(σ, res) to describe the original physical meaning difference between the residual and the standard deviation. The second scale factor scale(σ, res) is used to represent the mapping relationship between the residual and the standard deviation, and can be pre-configured. Alternatively, the second scale factor can be decoded from the bitstream corresponding to the current block, and the output is the target standard deviation σ_hat after scaling modification. Obviously, the target standard deviation σ_hat can be determined based on the initial standard deviation σ, the first scale factor "scale", and the second scale factor scale(σ, res) For example, the product of the initial standard deviation σ, the first scale factor "scale", and the second scale factor scale(σ, res) can be the target standard deviation σ_hat.

Due to the inherent differences between the residual and the parameter σ of the normal distribution, 1:1 is not the optimal mapping relationship. Therefore, to make the initial standard deviation σ more accurately perceive the changes in the residual, as shown in the following formula σ_hat=Scale(σ, res)*Scale*σ, the initial standard deviation σ is not only modified by the first scale factor "scale", but also by the second scale factor scale(σ, res).

Embodiment 11: in Embodiments 9 and 10, scale factor modification with "scale" is directly performed on the initial standard deviation σ. In Embodiment 11, the input z_hat of the hyperscale decoding network used to generate the initial standard deviation σ is modified. that is, the initial coefficient hyperparameter feature z_hat is modified to obtain the target coefficient hyperparameter feature ẑ. After inputting the target coefficient hyperparameter feature ẑ to the hyperscale decoding network, the target standard deviation σ_hat can be obtained. For example, to enable the target standard deviation σ_hat to synchronously perceive the changes of the residual, a probability model modification module is provided after the initial coefficient hyperparameter feature z_hat, aiming to map the changes in the residual to the initial coefficient hyperparameter feature z_hat. The input consists of the initial coefficient hyperparameter feature z_hat and the first scale factor scale" (i.e., the first scale factor of the G-unit process), and the output is the target coefficient hyperparameter feature ẑ. After the target coefficient hyperparameter feature ẑ is input into the hyperscale decoding network, the target standard deviation σ_hat can be obtained. Obviously, the target coefficient hyperparameter feature ẑ can be determined based on the initial coefficient hyperparameter feature z_hat and the first scale factor "scale". For example, the product of the initial coefficient hyperparameter feature z_hat and the first scale factor "scale" is the target coefficient hyperparameter feature 2, and the target standard deviation σ_hat can be determined based on the target coefficient hyperparameter feature ẑ.

In Embodiment 11, the mapping relationship adopts a 1:1 scaling relationship, that is. the first scale factor of G-Unit is operated once on the initial coefficient hyperparameter feature z_hat in the same way to generate the target coefficient hyperparameter feature ẑ. This process can be seen in the following formula ẑ=Scale*z_hat, such that the distribution of the residual can be predicted in the target probability distribution model N~(0, σ_hat).

Embodiment 12: based on the scaling strategy of the initial coefficient hyperparameter feature z_hat in Embodiment 11, in Embodiment 12, not only the numerical scaling of the residual feature res at the encoding end is considered, but also the difference in physical meaning between the residual feature and the initial coefficient hyperparameter feature z_hat itself is taken into account. For example, the input of the probability model modification module not only includes the initial coefficient hyperparameter feature z_hat and the first scale factor "scale" (i.e., the first scale factor of the G-unit process), but also includes a third scale factor Scale(z_hat, res) to describe the original physical meaning difference between the residual and coefficient hyperparameter feature. The third scale factor Scale(z_hat, res) is used to represent the mapping relationship between the residual and the coefficient hyperparameter feature, and can be pre-configured. Alternatively, the third scale factor can be obtained by decoding from the bitstream corresponding to the current block. The output is the target coefficient hyperparameter feature ẑ after scaling modification. Obviously, the target coefficient hyperparameter feature ẑ can be determined based on the initial coefficient hyperparameter feature z_hat, the first scale factor "scale", and the third scale factor Scale(z_hat, res). For example, the product of z_hat, "scale", and Scale(z_hat, res) can be the target coefficient hyperparameter feature ẑ.

Due to the inherent differences between the residual and the coefficient hyperparameter feature, 1:1 is not the optimal mapping relationship. Therefore, to make the coefficient hyperparameter feature more accurately perceive the changes in the residual, as shown in the following formula ẑ=Scale(z_hat, res)*Scale*z_hat, the initial coefficient hyperparameter feature z_hat is not only modified by the first scale factor scale ", but also by the third scale factor Scale(z_hat, res).

The above embodiments can be implemented separately or in combination. For example, each of embodiments 1-12 can be implemented separately, and at least two of embodiments 1-12 can be implemented in combination.

For example, in the above embodiments, the content of the encoding end can also be applied to the decoding end, that is, the decoding end can process in the same way, and the content of the decoding end can also be applied to the encoding end, that is, the encoding end can process in the same way.

Based on the same application concept as the above method, the embodiments of the present disclosure further provide a decoding device. The device is applied to the decoding end. The device includes, one or more memories configured to store video data; and a decoder configured to implement the decoding method in embodiments 1-12, namely the processing flow of the decoding end.

For example, in an embodiment, a decoder is configured to achieve:

obtaining a target probability distribution model corresponding to a first scale factor based on a first bitstream corresponding to a current block;

decoding, based on the target probability distribution model corresponding to the first scale factor, a second bitstream corresponding to the current block to obtain a modified residual feature for the current block; and determining a reconstructed picture block for the current block based on the modified residual feature.

Based on the same application concept as the above method, the embodiments of the present disclosure further provide an encoding device. The device is applied to the encoding end. The device includes: one or more memories configured to store video data; and an encoder configured to implement the encoding method in embodiments 1-12, namely the processing flow of the encoding end.

For example, in an embodiment, an encoder is configured to achieve:

modifying a residual feature corresponding to a current block to obtain a modified residual feature;

obtaining a target probability distribution model corresponding to a first scale factor based on a first bitstream corresponding to a current block;

encoding the modified residual feature based on the target probability distribution model to obtain a second bitstream corresponding to the current block; and transmitting the second bitstream to a decoding end.

Figure 10A:
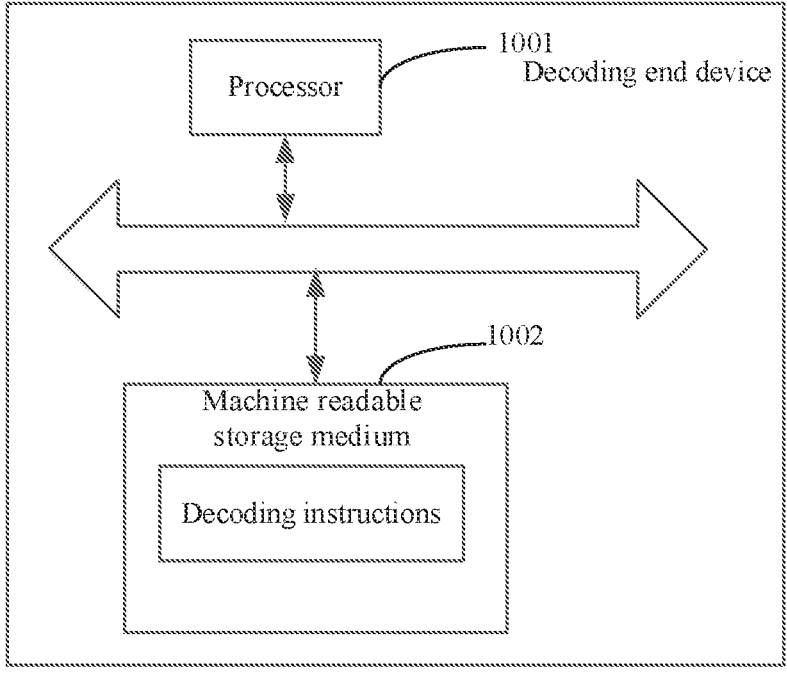
FIG. 10A is a hardware structure diagram of a decoding device according to an embodiment of the present disclosure.

Based on the same application concept as the above methods, a decoding device (also referred to as a video decoder) provided in the embodiments of the present disclosure has, from a hardware perspective, a hardware architecture, as shown in FIG. 10A. The hardware architecture includes processor 1001 and machine-readable storage medium 1002, where machine-readable storage medium 1002 stores machine executable instructions that can be executed by processor 1001. Processor 1001 is configured to execute machine executable instructions to implement the decoding methods of embodiments 1-12 in the present disclosure. For example, in an embodiment, the decoding device is configured to implement:

obtaining a target probability distribution model corresponding to a first scale factor based on a first bitstream corresponding to a current block;

decoding, based on the target probability distribution model corresponding to the first scale factor, a second bitstream corresponding to the current block to obtain a modified residual feature for the current block; and determining a reconstructed picture block for the current block based on the modified residual feature.

Figure 10B:
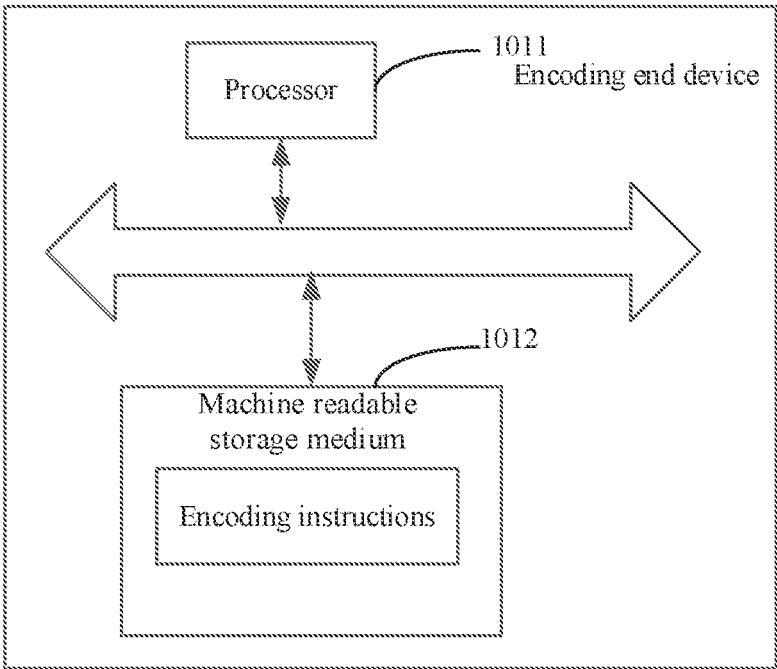
FIG. 10B is a hardware structure diagram of an encoding device according to an embodiment of the present disclosure.

Based on the same application concept as the above methods, the encoding device (also referred to as a video encoder) provided in the embodiments of the present disclosure. from a hardware perspective, can be specifically illustrated in FIG. 10B for schematic of its hardware architecture schematic. The hardware architecture schematic includes processor 1011 and machine-readable storage medium 1012, where machine-readable storage medium 1012 stores machine executable instructions that can be executed by processor 1011.; The processor 1011 is configured to execute machine executable instructions to implement the encoding methods of embodiments 1-12 in the present disclosure. For example, in an embodiment, the encoding device is configured to implement:

obtaining a target probability distribution model corresponding to a first scale factor based on a first bitstream corresponding to a current block;

decoding, based on the target probability distribution model corresponding to the first scale factor, a second bitstream corresponding to the current block to obtain a modified residual feature for the current block; and determining a reconstructed picture block for the current block based on the modified residual feature.

Based on the same application concept as the above methods, the embodiments of the present disclosure provide an electronic device. The electronic device includes processor and machine-readable storage medium, where machine-readable storage medium stores machine executable instructions that can be executed by processor; the processor is configured to execute machine executable instructions to implement the decoding method or encoding method of embodiments 1-12 in the present disclosure.

Based on the same application concept as the above methods, the embodiments of the present disclosure further provide a machine-readable storage medium, which stores several computer instructions. When the computer instructions are executed by a processor, the methods in the embodiments of the present disclosure can be implemented, such as the decoding methods or encoding methods in the above embodiments.

Based on the same application concept as the above methods, the embodiments of the present disclosure further provide a computer application program that, when executed by a processor, the decoding methods or encoding methods in the embodiments of the present disclosure are implemented.

Based on the same application concept as the above method, the embodiments of the present disclosure further provide a decoding apparatus, which is applied to the decoding end. The apparatus includes: an obtaining module configured for obtaining a target probability distribution model corresponding to a first scale factor based on a first bitstream corresponding to a current block: a decoding module configured for decoding, based on the target probability distribution model corresponding to the first scale factor, a second bitstream corresponding to the current block to obtain a modified residual feature for the current block; and a determining module configured for determining a reconstructed picture block for the current block based on the modified residual feature.

For example, when obtaining the target probability distribution model corresponding to the first scale factor based on the first bitstream corresponding to the current block, the obtaining module is configured for: obtaining a target probability distribution parameter corresponding to the first scale factor based on the first bitstream corresponding to the current block; and determining the target probability distribution model based on the target probability distribution parameter.

For example, the target probability distribution parameter includes: a target mean, a target standard deviation, or both.

For example, when the target probability distribution parameter includes the target standard deviation, when obtaining the target probability distribution parameter corresponding to the first scale factor based on the first bitstream corresponding to the current block, the obtaining module is configured for: decoding the first bitstream to obtain an initial coefficient hyperparameter feature corresponding to the current block: performing coefficient hyperparameter feature inverse transformation on the initial coefficient hyperparameter feature to obtain an initial standard deviation; and modifying the initial standard deviation based on the first scale factor to obtain the target standard deviation.

For example, when modifying the initial standard deviation based on the first scale factor to obtain the target standard deviation, the obtaining module is configured for: generating a target scale factor based on the first scale factor; and modifying the initial standard deviation based on the target scale factor to obtain the target standard deviation.

For example, the target scale factor is the first scale factor; or the target scale factor is determined based on the first scale factor and the second scale factor;
where the second scale factor is used to represent the mapping relationship between the residual and the standard deviation.

For example, the second scale factor is pre-configured; or the second scale factor is obtained by decoding the bitstream corresponding to the current block.

For example, when the target probability distribution parameter includes the target standard deviation, when obtaining the target probability distribution parameter corresponding to the first scale factor based on the first bitstream corresponding to the current block, the obtaining module is configured for: decoding the first bitstream to obtain an initial coefficient hyperparameter feature corresponding to the current block: modifying the initial coefficient hyperparameter feature based on the first scale factor to obtain a target coefficient hyperparameter feature; and performing coefficient hyperparameter feature inverse transformation on the target coefficient hyperparameter feature to obtain the target standard deviation.

For example, when modifying the initial coefficient hyperparameter feature based on the first scale factor to obtain a target coefficient hyperparameter feature, the obtaining module is configured for: generating a target scale factor based on the first scale factor; and modifying the initial coefficient hyperparameter feature based on the target scale factor to obtain the target coefficient hyperparameter feature.

For example, the target scale factor is the first scale factor; or
the target scale factor is determined based on the first scale factor and the third scale factor;
where the third scale factor is used to represent the mapping relationship between the residual and the coefficient hyperparameter feature.

For example, the third scale factor is pre-configured; or the third scale factor is obtained by decoding the bitstream corresponding to the current block.

Based on the same application concept as the above methods, the embodiments of the present disclosure further provide an encoding apparatus, which is applied to the encoding end. The apparatus includes: a modifying module configured for modifying the residual feature corresponding to the current block to obtain the modified residual feature;

an obtaining module configured for obtaining the target probability distribution model corresponding to the first scale factor based on the first bitstream corresponding to the current block; an encoding module configured for encoding the modified residual feature based on the target probability distribution model to obtain the second bitstream corresponding to the current block, and transmitting the second bitstream to the decoding end.

For example, when modifying the residual feature corresponding to the current block to obtain the modified residual feature, the modifying module is configured for: modifying the residual feature corresponding to the current block based on the first scale factor to obtain the modified residual feature.

For example, when obtaining the target probability distribution model corresponding to the first scale factor based on the first bitstream corresponding to the current block, the obtaining module is configured for: obtaining a target probability distribution parameter corresponding to the first scale factor based on the first bitstream corresponding to the current block; and determining the target probability distribution model based on the target probability distribution parameter.

For example, the encoding module is further configured for: performing feature transformation on the current block to obtain the picture feature corresponding to the current block: performing coefficient hyperparameter feature transformation on the picture feature to obtain an initial coefficient hyperparameter feature corresponding to the current block; and encoding the initial coefficient hyperparameter feature to obtain the first bitstream.

It should be understood by those skilled in the art that embodiments of the present disclosure can be provided as methods, systems, or computer program products. The present disclosure can take the form of an entirely hardware embodiment, an entirely software embodiment, or an embodiment combining software and hardware aspects. The present disclosure can employ the form of a computer program product implemented on one or more computer-usable storage media (including, but not limited to, disk storage, CD-ROM, optical storage, etc.), where the one or more computer-usable storage media having computer-usable program code. The above description is only embodiments of the present disclosure and is not intended to limit the present disclosure. For those skilled in the art, various modifications and changes can be made in the present disclosure. Any modification, equivalent replacement, improvement, etc. present the spirit and principle of the present disclosure shall be included in the scope of the claims of the present disclosure.

The invention claimed is:

1. A method of image decoding implemented by a decoding device, comprising:
obtaining a target probability distribution parameter corresponding to a first scale factor based on a first bitstream corresponding to the current block;
determining a target probability distribution model based on the target probability distribution parameter;
decoding a second bitstream corresponding to the current block based on the target probability distribution model corresponding to the first scale factor, to obtain a modified residual feature for the current block; and
determining a reconstructed picture block for the current block based on the modified residual feature;
wherein when the target probability distribution parameter comprises the target standard deviation, obtaining the target probability distribution parameter corresponding to the first scale factor based on the first bitstream corresponding to the current block comprises:

decoding the first bitstream to obtain an initial coefficient hyperparameter feature corresponding to the current block;

performing coefficient hyperparameter feature inverse transformation on the initial coefficient hyperparameter feature to obtain an initial standard deviation; and modifying the initial standard deviation based on the first scale factor to obtain the target standard deviation.

2. The method according to claim 1, wherein performing the coefficient hyperparameter feature inverse transformation on the initial coefficient hyperparameter feature to obtain the initial standard deviation comprises:

inputting the initial coefficient hyperparameter feature into a hyperscale decoding network, where the coefficient hyperparameter feature inverse transformation is performed by the hyperscale decoding network on the initial coefficient hyperparameter feature to obtain the initial standard deviation;

wherein the hyperscale decoding network is a trained neural network.

3. The method according to claim 1, wherein modifying the initial standard deviation based on the first scale factor to obtain the target standard deviation comprises:

determining a product value of the initial standard deviation and the first scaling factor as the target standard deviation.

4. The method according to claim 1, wherein the target probability distribution parameter further comprises a target mean.

5. The method according to claim 4, wherein the target mean is 0.

6. A method of image encoding implemented by an encoding device, comprising:

modifying a residual feature corresponding to a current block to obtain a modified residual feature;

obtaining a target probability distribution parameter corresponding to a first scaling factor;

determining a target probability distribution model based on the target probability distribution parameter; and encoding the modified residual feature based on the target probability distribution model to obtain a second bitstream corresponding to the current block; and transmitting the second bitstream to a decoding end;

wherein, when the target probability distribution parameter comprises a target standard deviation, and obtaining the target probability distribution parameter corresponding to the first scaling factor comprises:

obtaining an initial coefficient hyperparameter feature;

performing coefficient hyperparameter feature inverse transformation on the initial coefficient hyperparameter feature to obtain an initial standard deviation;

modifying the initial standard deviation based on the first scaling factor to obtain the target standard deviation.

7. The method of claim 6, wherein modifying the residual feature corresponding to the current block to obtain the modified residual feature comprises:

modifying the residual feature corresponding to the current block based on the first scale factor to obtain the modified residual feature.

8. The method of claim 6, wherein the method further comprises:

performing feature transformation on the current block to obtain a picture feature corresponding to the current block;

performing coefficient hyperparameter feature transformation on the picture feature to obtain an initial coefficient hyperparameter feature corresponding to the current block; and encoding the initial coefficient hyperparameter feature to obtain the first bitstream.

9. An encoding device, comprising: one or more processors and one or more machine-readable storage media, wherein the one or more machine-readable storage media store machine executable instructions that are executable by the one or more processors; and the one or more processors are configured to execute the machine executable instructions to implement the method according to claim 6.

10. The method according to claim 6, wherein the target probability distribution parameter further comprises a target mean.

11. The method according to claim 10, wherein the target mean is 0.

12. A non-transitory machine readable storage medium, wherein the machine readable storage medium stores computer instructions, and one or more processors execute the computer instructions to implement the method according to claim 6.

13. A decoding device, comprising: one or more processors and one or more machine-readable storage media, wherein the one or more machine-readable storage media store machine executable instructions that are executable by the one or more processors; and the one or more processors are configured to execute the machine executable instructions to implement:

obtaining a target probability distribution parameter corresponding to a first scale factor based on a first bitstream corresponding to the current block;

determining a target probability distribution model based on the target probability distribution parameter;

decoding a second bitstream corresponding to the current block based on the target probability distribution model corresponding to the first scale factor, to obtain a modified residual feature for the current block; and determining a reconstructed picture block for the current block based on the modified residual feature;

wherein when the target probability distribution parameter comprises the target standard deviation, obtaining the target probability distribution parameter corresponding to the first scale factor based on the first bitstream corresponding to the current block comprises:

decoding the first bitstream to obtain an initial coefficient hyperparameter feature corresponding to the current block;

performing coefficient hyperparameter feature inverse transformation on the initial coefficient hyperparameter feature to obtain an initial standard deviation; and modifying the initial standard deviation based on the first scale factor to obtain the target standard deviation.

14. The decoding device according to claim 13, wherein performing the coefficient hyperparameter feature inverse transformation on the initial coefficient hyperparameter feature to obtain the initial standard deviation comprises:

inputting the initial coefficient hyperparameter feature into a hyperscale decoding network, where the coefficient hyperparameter feature inverse transformation is performed by the hyperscale decoding network on the initial coefficient hyperparameter feature to obtain the initial standard deviation;

wherein the hyperscale decoding network is a trained neural network.

15. The decoding device according to claim 13, wherein modifying the initial standard deviation based on the first scale factor to obtain the target standard deviation comprises:

determining a product value of the initial standard deviation and the first scaling factor as the target standard deviation.

16. The decoding device according to claim 13, wherein the target probability distribution parameter further comprises a target mean.

17. The method according to claim 16, wherein the target mean is 0.

18. A non-transitory machine readable storage medium, wherein the machine readable storage medium stores computer instructions, and one or more processors execute the computer instructions to implement:

obtaining a target probability distribution parameter corresponding to a first scale factor based on a first bitstream corresponding to the current block;

determining a target probability distribution model based on the target probability distribution parameter;

decoding a second bitstream corresponding to the current block based on the target probability distribution model corresponding to the first scale factor, to obtain a modified residual feature for the current block; and determining a reconstructed picture block for the current block based on the modified residual feature;

wherein when the target probability distribution parameter comprises the target standard deviation, obtaining the target probability distribution parameter corresponding to the first scale factor based on the first bitstream corresponding to the current block comprises:

decoding the first bitstream to obtain an initial coefficient hyperparameter feature corresponding to the current block;

performing coefficient hyperparameter feature inverse transformation on the initial coefficient hyperparameter feature to obtain an initial standard deviation; and modifying the initial standard deviation based on the first scale factor to obtain the target standard deviation.

19. The non-transitory machine readable storage medium according to claim 18, wherein performing the coefficient hyperparameter feature inverse transformation on the initial coefficient hyperparameter feature to obtain the initial standard deviation comprises:

inputting the initial coefficient hyperparameter feature into a hyperscale decoding network, where the coefficient hyperparameter feature inverse transformation is performed by the hyperscale decoding network on the initial coefficient hyperparameter feature to obtain the initial standard deviation;

wherein the hyperscale decoding network is a trained neural network.

20. The non-transitory machine readable storage medium according to claim 18, wherein modifying the initial standard deviation based on the first scale factor to obtain the target standard deviation comprises:

determining a product value of the initial standard deviation and the first scaling factor as the target standard deviation.

* * * * *